(12) United States Patent
Chai et al.

(10) Patent No.: US 10,346,655 B2
(45) Date of Patent: Jul. 9, 2019

(54) BATTERY-FREE TOUCH-AWARE USER INPUT USING RFID TAGS

(71) Applicant: NEC Laboratories America, Inc., Princeton, NJ (US)

(72) Inventors: Eugene Chai, Monmouth Junction, NJ (US); Swadhin Pradhan, Austin, TX (US); Sampath Rangarajan, Bridgewater, NJ (US); Mohammad Khojastepour, Lawrenceville, NJ (US); Karthikeyan Sundaresan, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/833,995

(22) Filed: Dec. 6, 2017

(65) Prior Publication Data

US 2018/0157876 A1  Jun. 7, 2018

Related U.S. Application Data

(60) Provisional application No. 62/431,385, filed on Dec. 7, 2016.

(51) Int. Cl.
| | |
|---|---|
| *G06K 7/10* | (2006.01) |
| *G06K 19/07* | (2006.01) |
| *G06N 20/00* | (2019.01) |

(52) U.S. Cl.
CPC ..... *G06K 7/10366* (2013.01); *G06K 19/0718* (2013.01); *G06K 19/0723* (2013.01); *G06N 20/00* (2019.01)

(58) Field of Classification Search
CPC .......... G06K 7/10366; G06K 19/0723; G06N 99/005
USPC ....................................................... 235/451
See application file for complete search history.

(56) References Cited

U.S. PATENT DOCUMENTS

| | | | | |
|---|---|---|---|---|
| 8,917,202 | B2 * | 12/2014 | Grosinger | G01S 7/412 340/425.1 |
| 9,223,955 | B2 * | 12/2015 | Lymberopoulos | G06F 21/32 |
| 2014/0285324 | A1 * | 9/2014 | Austin | G01S 13/84 340/10.3 |

* cited by examiner

*Primary Examiner* — Toan C Ly
(74) *Attorney, Agent, or Firm* — Joseph Kolodka

(57) ABSTRACT

Aspects of the present disclosure describe a battery-free touch sensing user interface (UI) for Internet of Things (IoT) and other smart spaces employing Radio Frequency Identification (RFID) readers and tags that we call RIO. With RIO, any surface may be a touch-aware surface by attaching RFID tag(s) thereto. RIO advantageously supports custom-designed RFID tags and therefore facilitates customized UIs to be easily deployed in a real-world environment. RIO employs impedance tracking that results from a human finger—or other appendage—touching a surface of an RFID tag, thereby changing a characteristic impedance of the RFID tag antenna. This change manifests as a change in the phase of the RFID backscattered signal and is advantageously used by RIO to track fine-grained touch movement over the RFID tag. Disclosed further are multi-tag environments in which RIO operates and demonstrations including continuous tracking of finger movement during a swipe to within 3 mm of its actual position.

4 Claims, 49 Drawing Sheets

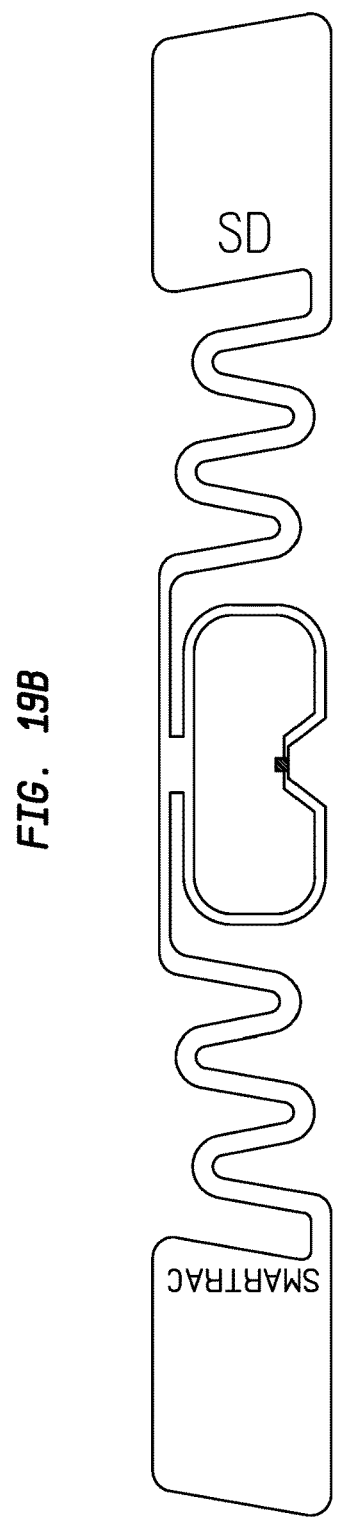

BATTERY-FREE TOUCH-AWARE USER INPUT USING RFID TAGS

CROSS REFERENCE TO RELATED APPLICATIONS

This application claims the benefit of U.S. Provisional Patent Application Ser. No. 62/431,385 filed Dec. 7, 2016 which is incorporated by reference as if set forth at length herein.

TECHNICAL FIELD

This disclosure relates generally to the global Internet and more specifically to battery-free touch tracking for the Internet of Things (IoT) which employs radio frequency (RF) based input-output (RFIO).

BACKGROUND

As is known, the IoT has attracted much attention recently as an evolution of an interconnected world that continues to offer significant convenience and advantages to contemporary life. Accordingly, systems, methods and structures that enhance the monitoring and/or interaction of persons with an IoT—and in particular radio frequency identification (RFID) tags would represent a welcome addition to the art.

SUMMARY

An advance in the art is made according to aspects of the present disclosure directed to systems, methods, and structures providing a seamless, intuitive interactive user interface between a user and smart devices that may—for example—be part of a larger Internet of Things. More specifically aspects of the present disclosure describe battery-free, fine-grained touch gesture input interface(s), structures, and methods using Radio Frequency Identification (RFID) tags.

In sharp contrast to the prior art, systems, methods and structures according to the present disclosure employ a technique of impedance tracking in backscatter communications to determine a user touch to an RFID tag as that touch moves over a surface of the tag.

Operationally, since a human body is conductive, exhibiting a capacitance on the order of hundreds of pico-Farads (pF) and a resistance of hundreds to thousands of Ohms, when a user touches an RFID tag, her body conductivity changes the effective impedance of the tag antenna. This impedance change manifests as a change in phase of the backscattered signal.

Systems, methods, and structures according to the present disclosure tracks this phase change to determine the location of the touching appendage (i.e., finger) upon an RFID tag. Of particular significance, systems, methods and structures according to the present disclosure exhibit a tracking error of less than 4% while employing only 4 training events.

Operationally, methods according to the present disclosure generally include receiving radio frequency identification (RFID) backscatter signals output from an RFID tag; and determining, from the received backscatter signals, a path traced by a portion of a user's body upon a surface of the RFID tag. Additional aspects of methods according to the present disclosure include determining a phase change of the backscattered signals. Still further aspects of methods according to the present disclosure include querying the RFID tag continuously; determining an average signal phase over a time interval T; determining that a touch occurred by the portion of a user's body. determining that the touch occurred when a phase change is detected that is larger than a threshold, C. Yet still further aspects of methods according to the present disclosure include switching to a tracking mode upon determining that a touch has occurred and/or subsequently updating the location of the portion of the user's body on the RFID surface during tracking mode through the effect of a segmental dynamic time warping (SDTW) methodology.

Advantageously, such methods according to the present disclosure—and in sharp contrast to the prior art—operate across multiple RFID tags simultaneously and accurately tracking the location of a user's body part across the RFID tag to within 3 mm of its actual location on the surface of the RFID tag.

BRIEF DESCRIPTION OF THE DRAWING

A more complete understanding of the present disclosure may be realized by reference to the accompanying drawing in which:

FIG. 1(a) and FIG. 1(b) are schematics illustrating example applications of RIO in which FIG. 1(a) shows RF IO (RIO) enabled home configuration and FIG. 1(b) shows a custom RIO tag for volume control according to aspects of the present disclosure;

FIG. 3(A), and FIG. 3(B) illustrate equipment and tags used in the swipe experiments in which: FIG. 3(A) shows the equipment setup and FIG. 3(B) shows an illustrative Monza R6 Dogbone RFID tag according to aspects of the present disclosure;

FIG. 4(A), FIG. 4(B), and FIG. 4(C) illustrate touch gestures in which: FIG. 4(A) shows a simple touch; FIG. 4(B) shows a swipe over a tag surface; and FIG. 4(C) shows a swipe along a tag edge according to aspects of the present disclosure;

FIG. 5(A), and FIG. 5(B) are graphs illustrating phase of backscattered RFID signals in which: FIG. 5(A) shows a simple touch at 1 to 3 seconds and FIG. 5(B) shows an illustrative swipe gesture according to aspects of the present disclosure;

FIG. 6(A), and FIG. 6(B) are graphs illustrating phase-change pattern(s) of backscatter signals with tag in NLOS locations in which: FIG. 6(A) shows a tag behind a wall and FIG. 6(B) shows a tag behind a door backscatter patterns according to aspects of the present disclosure;

FIG. 7(A), and FIG. 7(B) are photo-illustrations showing Vector Network Analyzer (VNA) measurement in which: FIG. 7(A) shows the VNA experimental setup and FIG. 7(B) shows a customized dogbone RFID tag for VNA experiment according to aspects of the present disclosure;

FIG. 8(A), and FIG. 8(B) are graphs illustrating VNA experimental results in which: FIG. 8(A) shows the Impedance vs. Position on Tag and FIG. 8(B) shows Phase (radians) vs. Position on Tag according to aspects of the present disclosure;

FIG. 9(A), and FIG. 9(B) are graphs illustrating phase behavior with or without nearby tags in which: FIG. 9(A) shows effect of mutual coupling distorting swipe phase behavior and FIG. 9(B) shows effect of mutual coupling reducing dynamic range of phase change according to aspects of the present disclosure;

FIG. 16(A), and FIG. 16(B) are photo-illustrations showing custom-designed RFID tags in which: FIG. 16(A) shows a circle custom tag and FIG. 16(B) shows a triangle custom tag according to aspects of the present disclosure;

FIG. 17(A), and FIG. 17(B) are graphs illustrating phase trends when a clockwise (CW) and counter-clockwise (CCW) swipe gestures are performed on the custom circle and triangle-shaped RFID tags in which: FIG. 17(A) shows a circle tag graph and FIG. 17(B) shows a triangle tag graph according to aspects of the present disclosure;

FIG. 18(A), and FIG. 18(B) are graphs illustrating RIO tracking accuracy with swipes of different speeds in which: FIG. 18(A) shows a graph for a RIO-single and FIG. 18(B) shows a graph for a RIO-multi according to aspects of the present disclosure;

FIG. 19(A), FIG. 19(B) FIG. 19(C), and FIG. 19(D) are schematic illustrations of RIO tag types tested in which: FIG. 19(A) shows a Smartrac Monza R5 RFID tag (tag 1); FIG. 19(B) shows a Smartrac Monza R6 G2IL RFID tag (tag 2); FIG. 19(C), shows an Alien-9640, Higgs-3 short-dipole paper gag (tag 3) and FIG. 19(D) shows an Alien-9730, Higgs-4 short-dipole paper tag (tag 4) according to aspects of the present disclosure;

FIG. 26(a) and FIG. 26(b) are graphs illustrating tracking accuracy with varying tilt angle of the tag with respect to antenna in which: FIG. 26(a) is for a single tag and FIG. 26(b) is for a multi-tag array according to aspects of the present disclosure;

FIG. 27(a) and FIG. 27(b) are graphs illustrating tracking accuracy with varying distance of the tag from the reader antenna in which: FIG. 27(a) is for a single tag and FIG. 27(b) is for a multi-tag array according to aspects of the present disclosure;

FIG. 28(a) and FIG. 28(b) are schematic illustrations of example applications in which: FIG. 28(a) is for a keyboard with 8 buttons and FIG. 28(b) is for a numeric touchpad with digit "6" traced (shown rotated 90 degrees) according to aspects of the present disclosure;

FIG. 29(a) and FIG. 29(b) are graphs illustrating false positive and negative rates for applications in which: FIG. 29(a) is for a keypress detection and FIG. 29(b) is for numeric digit sensing according to aspects of the present disclosure.

Figure 1A:
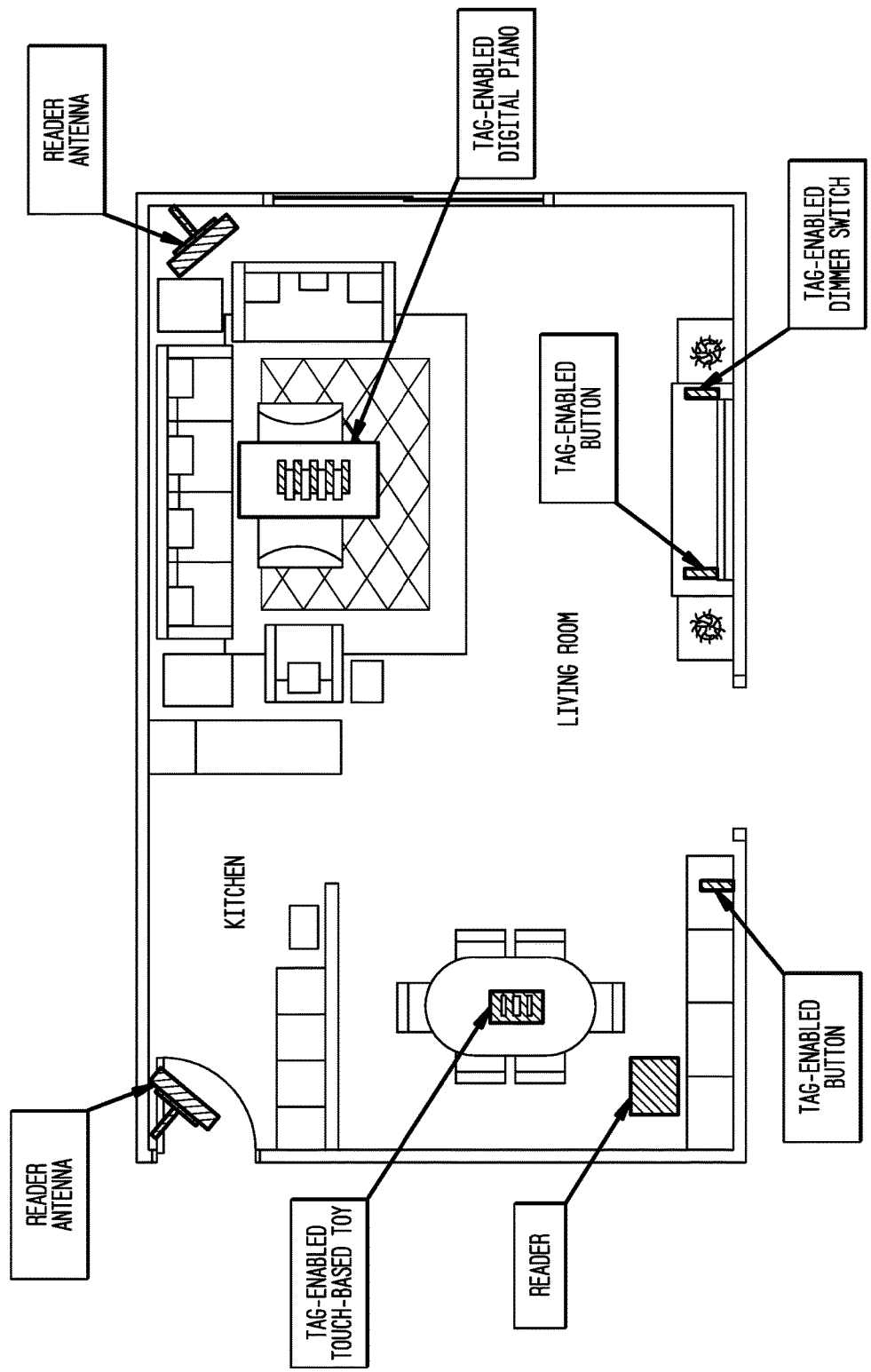

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

Introduction

Figure 1B:
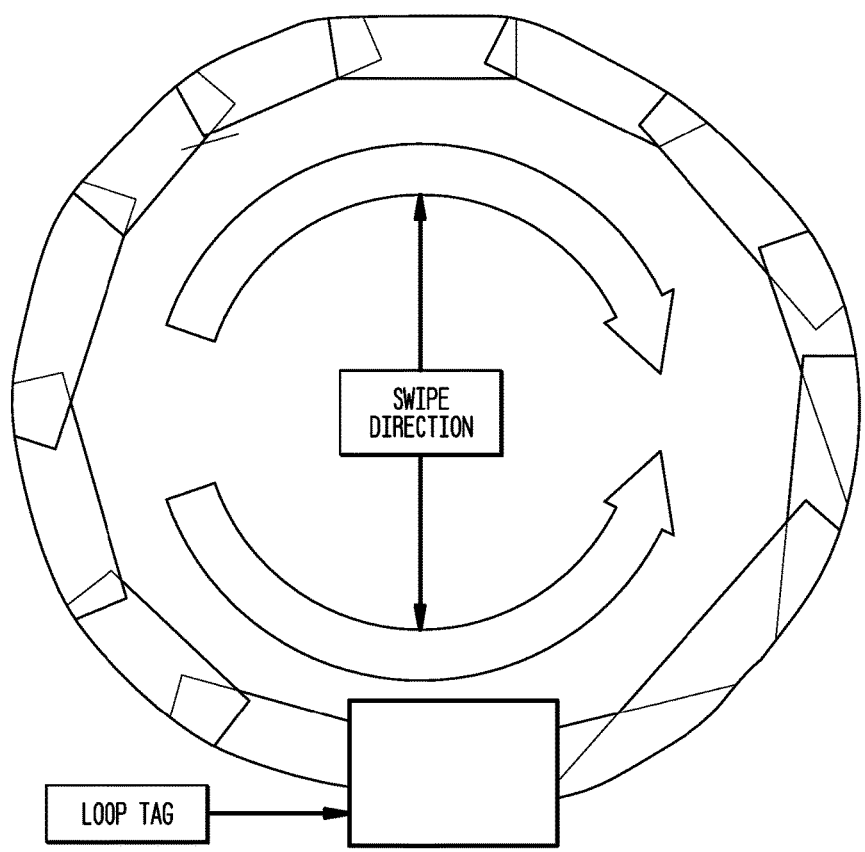

As will be readily appreciated by those skilled in the art, the future of the IoT demands a seamless, intuitive interaction between users and smart devices comprising the IoT. The vision is one of smart spaces such as that shown illustratively in FIG. 1(A) which shows a RIO-enabled home setup and FIG. 1(B) which shows an illustrative custom RIO tag for volume control. Imagine this vision where sensing and actuation interfaces are embedded into common objects, and are controlled through touch, voice command, or gestures.

Known examples of such input modalities include wireless gesture sensing which converts everyday body motions into input, and capacitive touch which recognizes physical actuation between a user and the IoT device. Consider the illustrative scenario if all these input modalities operate without the need for any built-in battery or power source, and are integrated into everyday devices such as cups, bowls, door knobs, mattresses, and built upon hardware so inexpensive and simple that it may be installed or discarded easily. In such an illustrative scenario, nearly any physical space can be converted into a smart space simply by embedding such input interfaces. The possibilities for such an input primitive are endless.

Battery-Free Touch UI. In this disclosure, we explore the design of a battery-free fine-grained touch gesture input interface using Radio Frequency Identification (RFID) technology. As is known and appreciated by those skilled in the art, RFIDs provide a low-cost, battery-free communication platform and have been used to develop sensing, activity recognition and localization solutions.

Among these notable works, machine learning techniques using the Physical (PHY-layer) features of both off-the-shelf and custom-built tags have been successful in classifying several well-defined gestures such as hand waving, touching and swiping. Other approaches have also designed custom backscatter capacitive measurement circuits to detect touch events on the tag antenna.

We note that these prior-art works only detect isolated, coarse-grained interactions and not fine-grained ones, such as the path traced by a finger over the surface of a tag. Machine learning approaches also impose a high training overhead that limits its deployment. For example, one illustrative machine learning system used 600 annotated interaction events to train and evaluate its classifier, and therefore increase the cost and difficulty of large-scale integration into smart-spaces.

In this disclosure, we advantageously improve upon existing works by employing commercial off-the-shelf (COTS) RFIDs as a battery-free, low-cost, fine-grained touch-based user input primitive. We design and implement such an input primitive using COTS RFID readers and tags.

As used throughout this disclosure, we call this primitive RIO, for RFID-based Input/Output. As we shall describe, RIO advantageously turns COTS RFID tags into touch interfaces: a user interacts with RIO by touching the tag, and RIO accurately tracks the touch as it moves over the surface of a tag.

As we shall show and describe, RIO employs novel techniques for impedance tracking in backscatter communications.

Operationally, and as is generally known by those skilled in the art, the human body is conductive, exhibiting a capacitance on the order of hundreds of pico-Farads (pF) and a resistance of hundreds to thousands of Ohms. When a user touches an RFID tag, his/her body conductivity changes the effective impedance of the tag antenna. This impedance change manifests as a change in phase of the backscattered signal. RIO tracks this phase change to determine the location of the touch within a tag.

By accurately modeling the relationship between impedance and RF phase, this fine-grained tracking can be achieved with minimal training overhead. As we shall describe, our evaluations show a tracking error of under 4% with only 4 training events (vs. 600 training events for others).

Upon reading this disclosure, those skilled in the art will readily appreciate that RIO offers at least three key features that make it ideal for IoT setting:

(i) Fine-Grained Accuracy.

RIO detects finger taps on RFID tags with 100% accuracy, and tracks finger swipe (or other touch) positions to within 3 mm of its true position (validated using a camera and OpenCV for finger tracking). This is achieved using off-the-shelf RFID tags, thus enabling a new battery-free, fine-grained and accurate UI primitive for smart-spaces.

(ii) Low-Cost Hardware.

RIO advantageously makes use of COTS RFID tags. We have tested RIO with a variety of tags, an example of which is the Monza 4D Dogbone tag. These tags are extremely low-cost, and can be purchased for as low as 14-cents each. The low-cost nature of RFID tags lowers the barrier to smart spaces as large numbers of tags can be installed within an area easily.

(iii) Customizable User Interface.

RIO also supports custom-designed RFID tags. We build tags with custom-shaped antennas by laying out the antennas with copper metal tape and inductively couple them to small near-field RFID tags. RIO tracks touch gestures over these custom antennas, and thus enables custom, application-specific interfaces to be built.

Applications.

These features of RIO offer a novel primitive for future IoT UI design. As an example, RFID tags can be placed throughout a room to be used—for example—as dimmer switches—a user swipes his/her finger up and down a tag to increase/decrease lighting brightness. Advantageously, a similar RIO interface may be used to increase/decrease the volume of audio systems. RIO also advantageously enables multiple tags to be arranged into an array. Such an array can be affixed to any table or wall to serve as a battery-free, wireless touch-pad to interact with home automation/entertainment systems.

Advantageously, RIO supports custom tags with antennas designed into application-specific control shapes. For example, a custom tag such as that shown illustratively in FIG. 1(B) can be installed on a sofa to allow users to adjust the volume of the TV by swiping (anti-)clockwise over the tag. Of course, the direction of swipe may be reversed as dictated by application requirements. Such applications require fine-grained continuous touch tracking, which is advantageously enabled by RIO. RIO thus enables a whole new selection of such intuitive, battery-free interfaces that can be embedded into every-day spaces.

As will now be apparent to those skilled in the art, in developing RIO as a practical, battery-free user-interface primitive, we addressed several challenges and may now make the following observations of our RIO systems, methods, and structures.

RIO is a Reliable Primitive for Touch Sensing.

To validate the reliability of RIO's primitive, we disclose a detailed measurement study of RFID backscatter signals in response to physical touch across the RFID antenna. We use both over-the-air and Vector Network Analyzer (VNA) measurements, to show how (a) the impedance of the RFID antenna will vary in response to physical touch; (b) the amount of variation depends on the location of the physical contact with the antenna; and (c) the variations in antenna impedance form the dominant factor (compared to other artifact like multi-path) contributing to a corresponding change in the magnitude and phase of the backscattered signal. Equipped with this understanding, those skilled in the art will appreciate that RIO uses this touch-dependent phase change behavior of RFID tags as a primitive to detect touches on a RFID tag, as well as to track the location of the finger during a swipe over the tag surface.

RIO is Resilient in a Multi-Tag Environment.

Previous works have identified that mutual coupling between tags has a significant impact on backscattered signal phase. Hence, when multiple RFID tags are deployed close together on the same surface, the backscattered phase is affected by both the physical contact with the RFID antenna, as well as mutual coupling affects, thereby substantially affecting the tracking accuracy. While previous works have made similar observations, the impact of such coupling has been overcome largely by building tolerance into the solution.

In sharp contrast, our RIO systems, methods and structures take a more active approach to model and understand the impact of inter-tag coupling on our primitive. With the help of our measurement campaign and supporting model, we show that while coupling can affect the phase change behavior on a desired tag and hence its tracking accuracy, it contributes to a stable, predictable phase-change pattern in the neighboring tags. Thus, by leveraging the joint phase-change behavior across multiple tags—and as will be readily appreciated by those skilled in the art—RIO translates the challenge of coupling into an opportunity to enhance the tracking accuracy even in multi-tag scenarios.

Leveraging RIO's Primitive.

As we shall describe, our design algorithms that leverage the touch-based phase-change primitive in RIO as well as the inter-tag coupling behavior to track touches to a median error of only 3 and 7 mm in single and multi-tag settings respectively. RIO's algorithms provide the flexibility to operate at various points in the accuracy-latency trade-off curve, allowing for a reasonable loss in accuracy for a more responsive real-time tracking.

Exploring RIO's Potential.

The ability to go beyond COTS tags expands the scope of applications possible with RIO. Custom-designed RFID tags mimicking different shapes, characters, etc. allow battery-free interfaces to be customized for specific smart spaces use cases in RIO. We describe how these tags can be constructed, and extend the touch/gesture tracking algorithms in RIO to support tracking applications with these custom-designed tags.

Realizing RIO in Practice.

We develop and disclose a prototype of RIO, and demonstrate its touch and gesture tracking accuracy using both COTS and custom-designed RFID tags. We demonstrate the robustness of RIO through exhaustive real-world evaluations, and show that accurate tracking is maintained even at different tag angles and distances to the RFID reader. We also develop two sample applications using custom-designed RFID tags to highlight the flexibility and practicality of RIO.

As we disclose, our evaluations demonstrate that RIO (a) detects a human touch event with 100% accuracy and (b) tracks the location of a human finger during a swipe gesture across the surface of a COTS RFID tag to within 3 mm (less than 4% of the length of the RFID tag).

Passive RFID Primer

Figure 2:
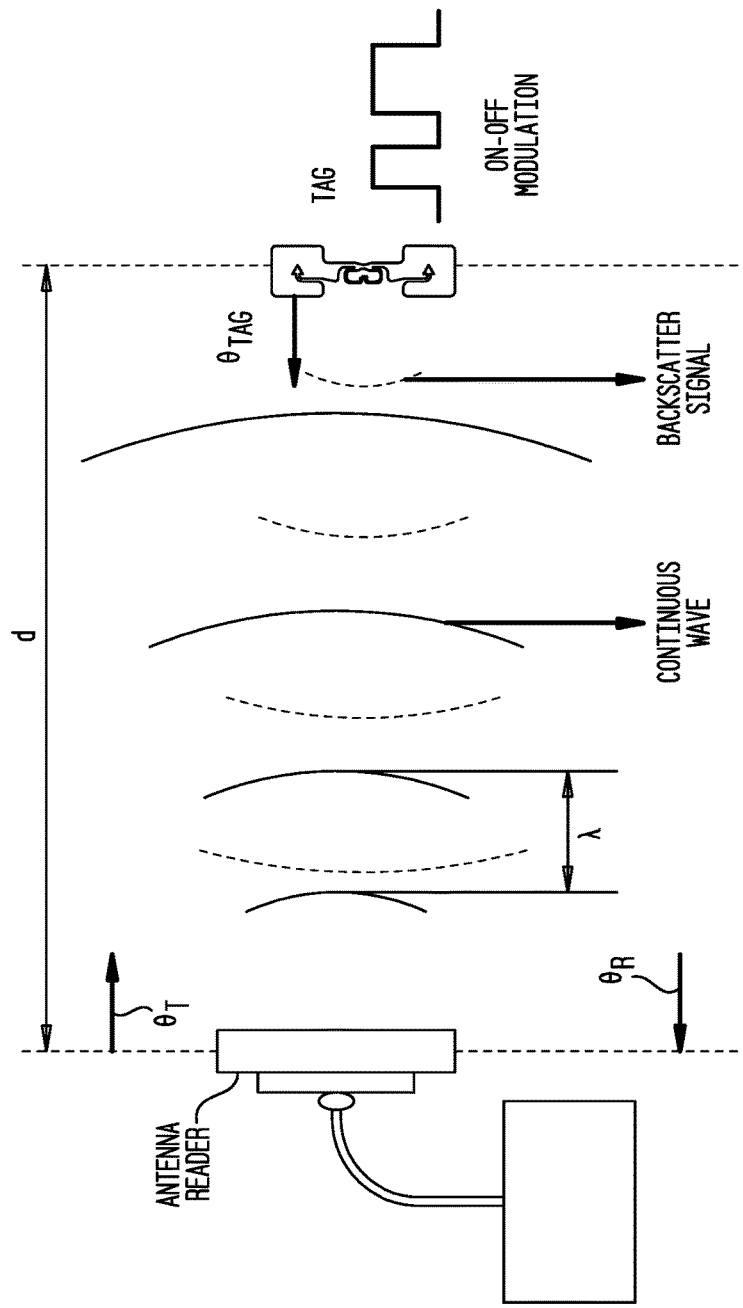
FIG. 2 is a schematic illustrating operation of an RFID reader, an antenna and a passive tag according to an aspect of the present disclosure.

As those skilled in the art will readily understand, passive RFID systems communicate using a backscatter radio link, as shown illustratively in FIG. 2—which illustratively shows the operation of an RFID reader, antenna and a tag. Operationally, the reader supplies a Continuous Wave (CW) periodic signal that persists indefinitely. The passive tags purely harvest energy from this CW signal. The tag then modulates its data on the backscatter signals using ON-OFF keying through changing the impedance on its antenna.

Figure 3A:
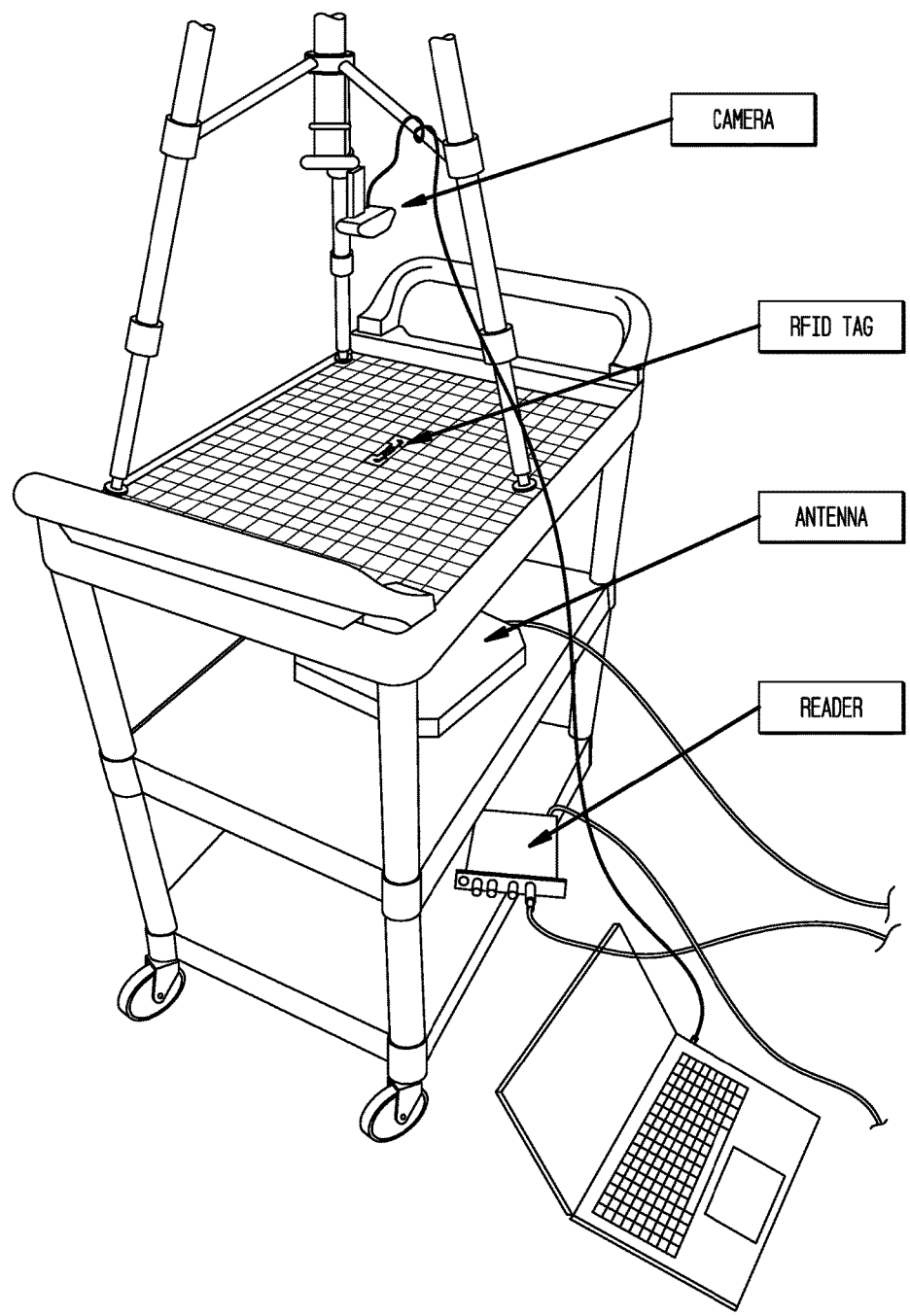
Figure 3B:
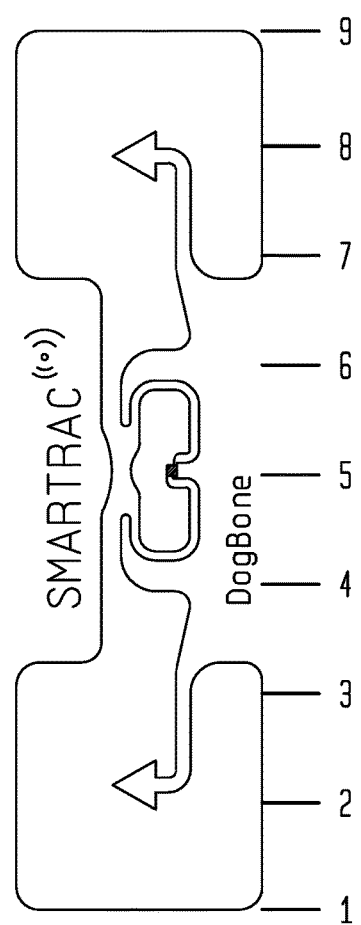

Turning now to FIG. 3(A) and FIG. 3(B), there is shown a photo illustration of equipment and tags used in the swipe experiment in which FIG. 3(A) shown an equipment setup and FIG. 3(B) shows an illustrative Monza R6 Dogbone RFID tag.

Passive RFID Tag:

A typical passive RFID tag, such as that as shown in FIG. 3(B), includes an antenna and an integrated circuit (chip). Generally—and as may be known by those skilled in the art—passive RFID tag absorbs the most energy when the chip impedance and the antenna impedance are conjugately matched, i.e., $Z_C = Z_a^*$.

Cots RFID Reader:

COTS RFID reader uses linear or circular polarized antennas for both transmitting and receiving. They generally provide facilities to access lower level information like RSS and phase values etc. through SDK. A COTS reader employs an open-loop estimation (e.g., preamble correlation) or a closed-loop estimation technique for acquiring phase and RSS.

Human Touch Primitive

Human touch on the RFID tag changes the effective impedance of the antenna, and will, in turn, influence the phase of the backscattered signal. In this section, we show how this phase-change behavior is used as a reliable and robust primitive for touch/gesture tracking in both single tag and multi-tag settings, and in the presence of artifacts such as multi-path and inter-tag coupling. We accomplish this with the help of both controlled and over-the-air measurements, and an analytical model that highlights the fundamental relationship between impedance change and RF phase.

How does Human Touch Change the Backscatter Phase of a Single RFID Tag?

FIG. 3(A), and FIG. 3(B) illustrate equipment and tags used in the swipe experiments in which: FIG. 3(A) shows the equipment setup and FIG. 3(B) shows an illustrative Monza R6 Dogbone RFID tag according to aspects of the present disclosure.

Figure 4A:
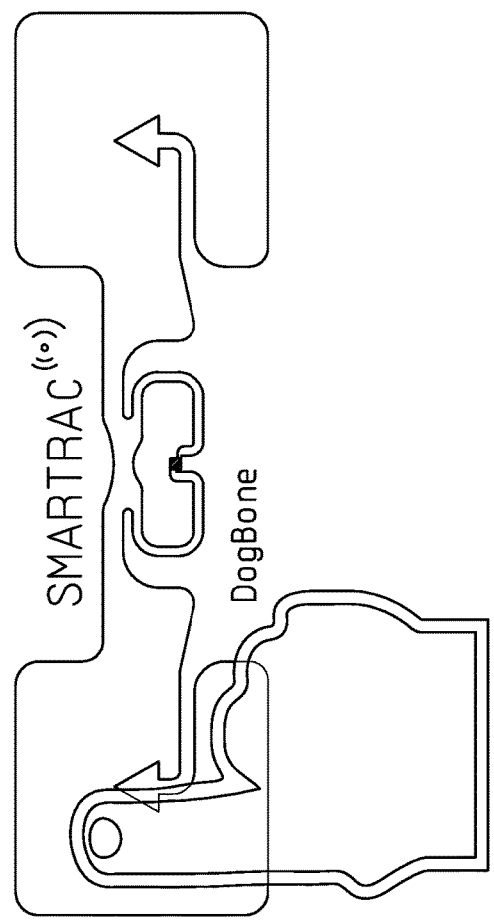
Figure 4B:
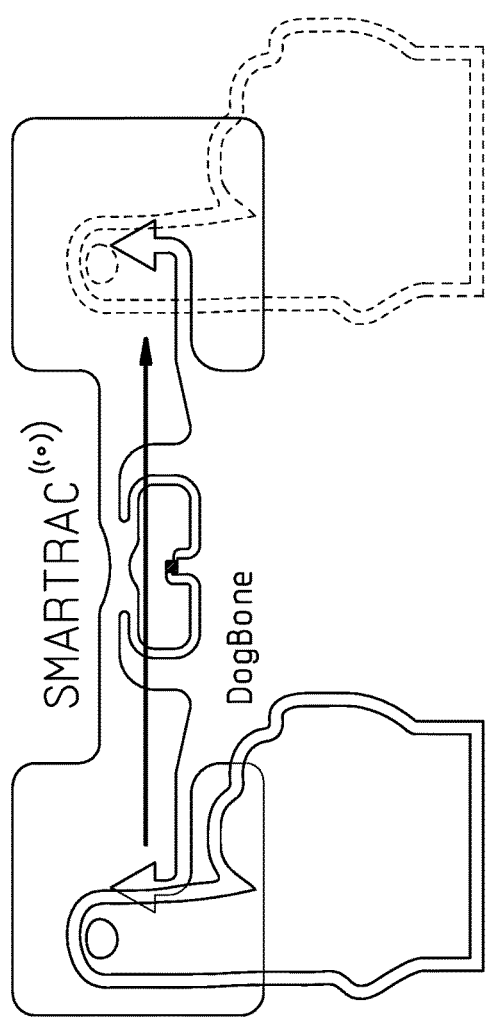
Figure 4C:
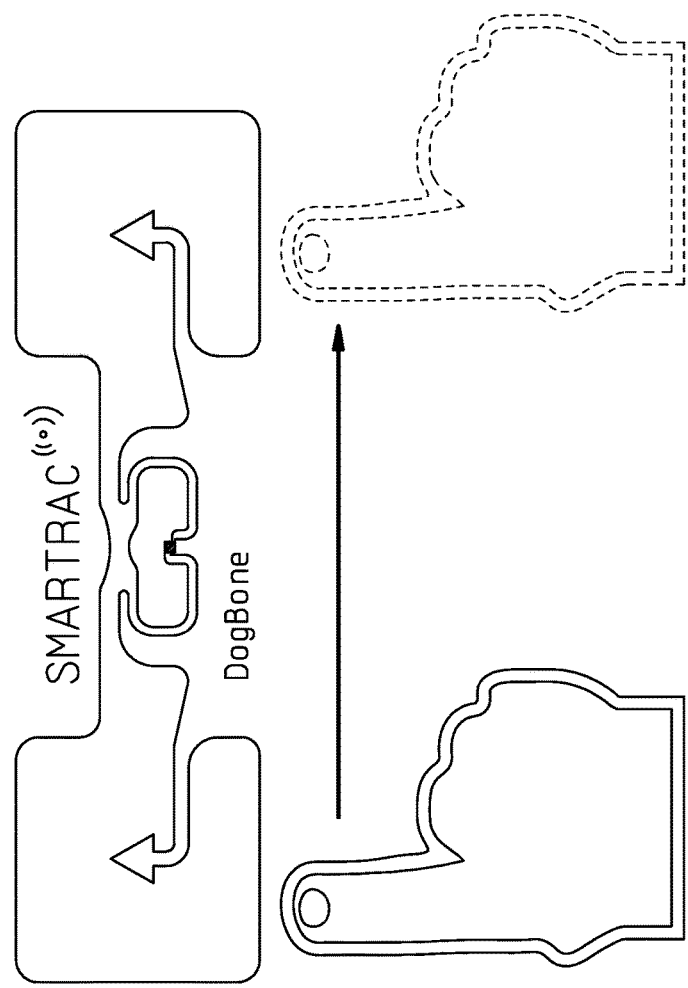

FIG. 3(A) illustrates the measurement setup that is used to study the touch-induced performance of the RFID tag. As depicted we attach a single RFID tag that is 1.5×10 cm in size (shown in FIG. 3(B)) on a flat surface, and place a 9 dBi circularly polarized RFID antenna 50 cm directly below it. The antenna is powered by an Impinj R420 RFID reader. Note that the camera shown in FIG. 3(A) is only used in later sections of this disclosure for accuracy measurements. For clarity, we divide the tag into 9 equal subsections, as shown schematically in FIG. 3(B) wherein it may be observed that position 5 corresponds to the middle, while 1 and 9 are at two, opposite ends of the tag FIG. 4(A), FIG. 4(B), and FIG. 4(C) illustrate touch gestures in which: FIG. 4(A) shows a simple touch; FIG. 4(B) shows a swipe over a tag surface; and FIG. 4(C) shows a swipe along a tag edge according to aspects of the present disclosure. We perform three gestures, as illustrated in FIG. 4(A), FIG. 4(B), and FIG. 4(C), namely a simple touch gesture where we touch one end of the tag (FIG. 4(A)), a swipe gesture where we start with a finger on one end of the RFID tag and move across the length of the tag at constant speed (FIG. 4(B)), and a swipe gesture that is performed along the edge of the tag but without touching the tag itself (FIG. 4(C)).

The RFID reader continuously queries the RFID tag during the entire swipe gesture at a rate of ~200 reads/second. We use the Octane SDK together with the Impinj R420 reader to obtain the phase and magnitude of the backscattered responses from the RFID tag. We make four observations from our experiments.

Figure 5A:
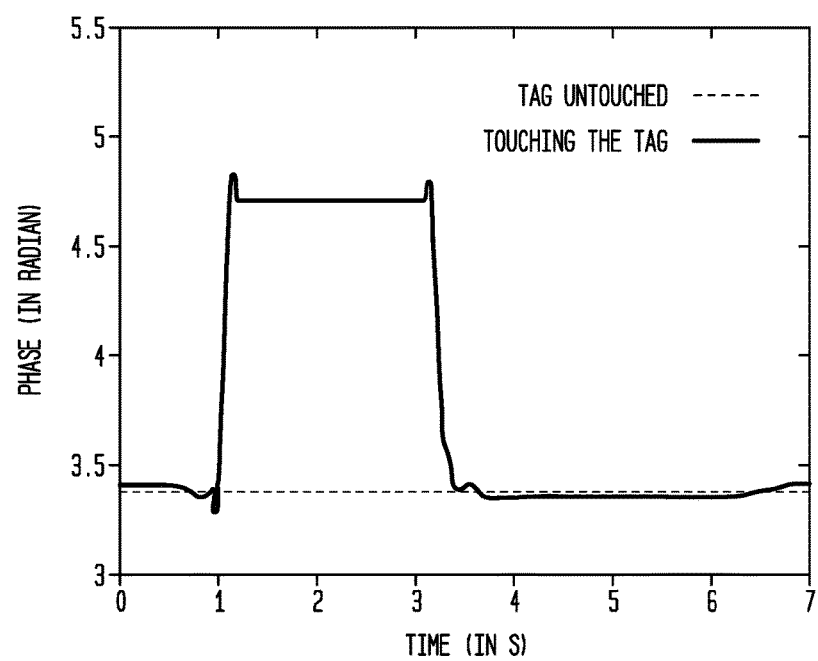
Figure 5B:
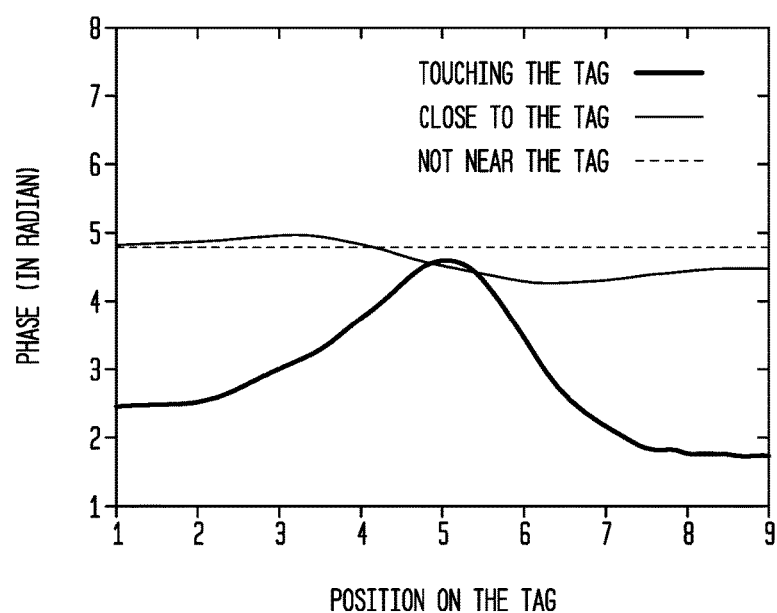

First, human touch induces significant phase changes in the backscattered response. FIG. 5(A), and FIG. 5(B) are graphs illustrating phase of backscattered RFID signals in which: FIG. 5(A) shows a simple touch at 1 to 3 seconds and FIG. 5(B) shows an illustrative swipe gesture according to aspects of the present disclosure. FIG. 5(A) shows the backscattered phase of the RFID tag when a simple touch is applied from 1 to 3 seconds after the start of the experiment. Observe that during this time interval, the backscattered phase jumps from 3.5 to 4.8 radians. The signal phase returns to 3.5 radians once the touch is removed. This demonstrates that a simple touch will induce a significant phase change (1.3 radians in this experiment), and is a simple method to detect a touch gesture on an RFID tag. This amount of phase change varies between tags, and can either increase or decrease in response to human touch.

Second, a swipe gesture induces different phase changes as the finger moves over the tag. FIG. 5(B) shows the absolute backscattered phase under the two different swipe gestures. Observe that with the swipe gesture over the RFID tag, the amount that the phase changes compared to an untouched tag varies depending on the position of the finger. This phase trend follows a symmetrical bell-shape, with about 3 radians between the highest and lowest phases, and starting from one end of the tag, the largest phase-change is seen when the swipe crosses its middle.

Third, human touch is the dominant cause of phase changes. FIG. 5(B) also shows the phase of the backscattered signal when the swipe gesture is performed without touching the antenna on the tag. Observe that while some phase changes are present, they are much less significant than when the touch gesture is performed directly on the tag. This observation, together with the measurement under NLOS conditions, shows that the dominant effect due to human touch can be measured under varying channel conditions.

Fourth, phase behavior is resilient to multipath interference. In order to study the effect of non-line-of-sight (NLOS) situations, we repeat the swiping gesture but with the tag and reader in different positions by separating them with (a) a wall, and (b) a door wherein the reader and tag are 2 m apart. Under such conditions, the indirect signal paths and associated multi-path distortion has a greater impact on the backscatter signal. Note that the maximum range at which an RFID tag can be read depends on both the RFID reader and the tag. Our Monza R6 tags have a theoretical maximum read range of over 6 m, but practically, this limit is close to the 2 m used in our NLOS experiment.

Figure 6A:
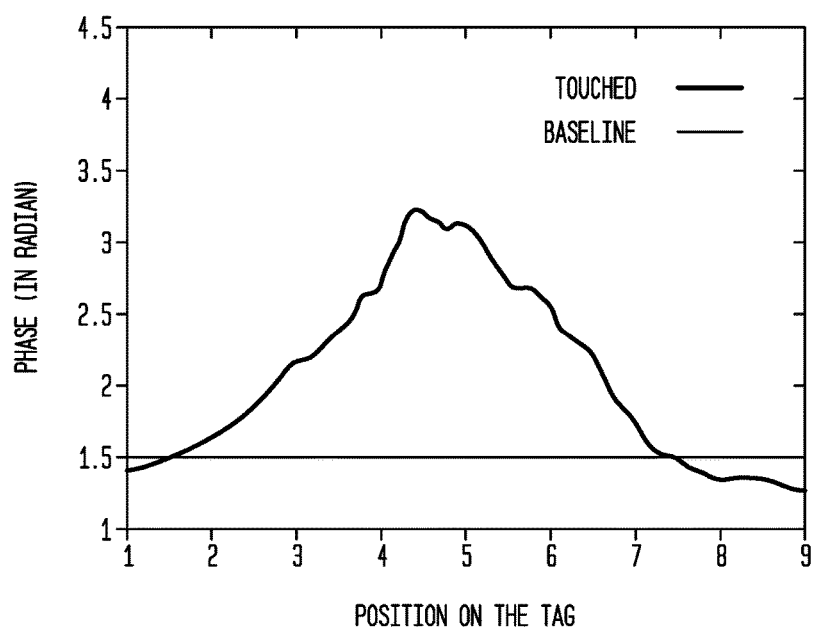
Figure 6B:
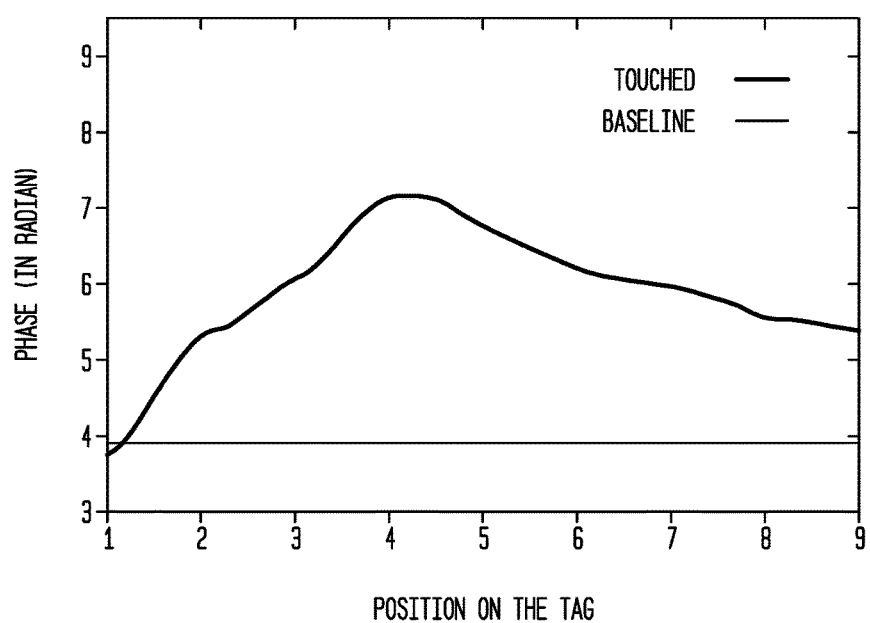

FIG. 6(A), and FIG. 6(B) are graphs illustrating phase-change pattern(s) of backscatter signals with tag in NLOS locations in which: FIG. 6(A) shows a tag behind a wall and FIG. 6(B) shows a tag behind a door backscatter patterns according to aspects of the present disclosure. FIG. 6 shows the phase of the backscattered signal under these two conditions (labeled Touched). The baseline plot shows the RF phase of the RFID tag without any human contact. Observe that even in NLOS situations, the bell-shaped phase change behavior seen earlier is maintained. Hence, even though multipath and NLOS effects can influence the RF phase readings, the impact of human touch on the phase of the backscattered signal is dominant.

Why does the Backscatter Phase Change with Human Touch?

The human body can be modeled as an electrical circuit with an equivalent resistance and capacitance. In particular, the human skin has a capacitance equivalent to hundreds of picofarads (pF). When a human touch is established with the RFID antenna, capacitive coupling is established between the human and the RFID antenna at the point of contact. We explain the impact of this coupling and verify its influence on the backscatter phase through real-world VNA circuit measurements.

Capacitive Coupling.

The radiation of RF signals from the RFID tag antenna is the result of time-varying current induced within the antenna. A change in the phase of this current will induce a corresponding phase change in the associated RF radiation. Hence, to understand how the phase of the backscattered signal changes, it is helpful to know how the phase of this induced current is affected by touch. The RFID tag in our experiments uses a dipole antenna for backscatter communications. Using a simplified model of dipole antennas, the current induced in the RFID antenna can be mathematically expressed as:

$$I_m = -\frac{E_{inc}}{(Z_C + Z_A)\gamma\cos^2(\gamma L/4)} \quad (1)$$

where $Z_C$ and $Z_A$ are the impedances of the RFID chip and antenna, respectively, $E_{inc}$ is the incident electric field on the RFID antenna, L is the length of the antenna, and $\gamma$ is the free-space phase constant. If the effective impedance of the antenna $Z_A$ is changed, Equation (1) shows that the induced current, and by extension, the backscattered electric field and signal, will undergo a corresponding change in phase and magnitude. However, how does human touch change the antenna impedance?

Through capacitive coupling, the human body becomes an extension of the RFID antenna. The effective impedance of the RFID antenna, $Z_A$, as presented to the RFID chip, is now a sum of the impedance of the antenna without human touch and the impedance introduced by the human finger. A change in phase in this effective impedance will cause a corresponding phase change in the current distribution within the antenna. As a result, the phase of the backscattered signal changes in response to human touch.

VNA Measurements.

We directly measure this the impedance change due to human touch using an Array Solutions Vector Network Analyzer (VNA). We use the same RFID tag shown in FIG.

3(B), but disconnect the RFID chip from the antenna, and solder the feed points of the RFID antenna directly to the electrical leads of the VNA.

Figure 7A:
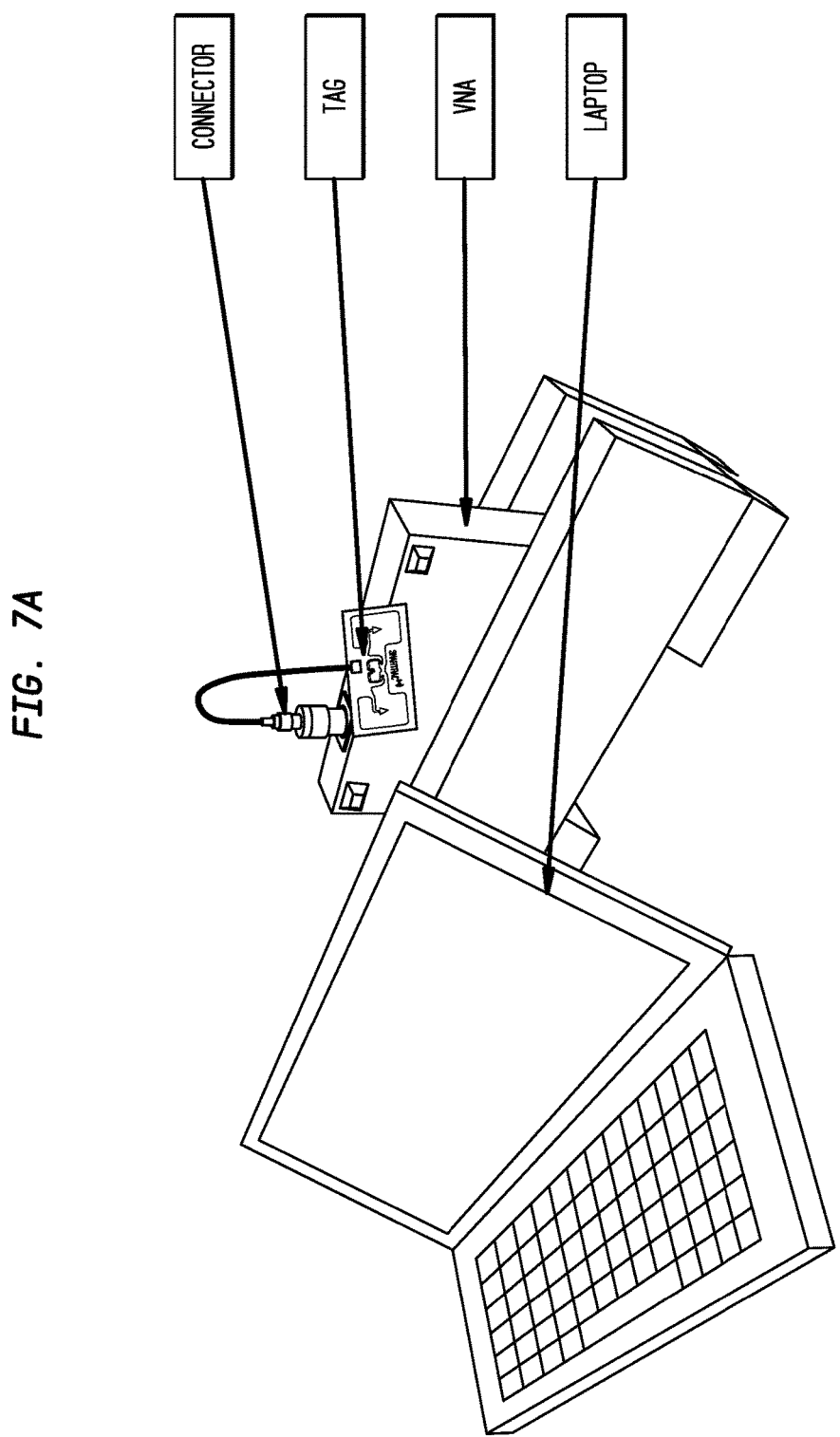
Figure 7B:
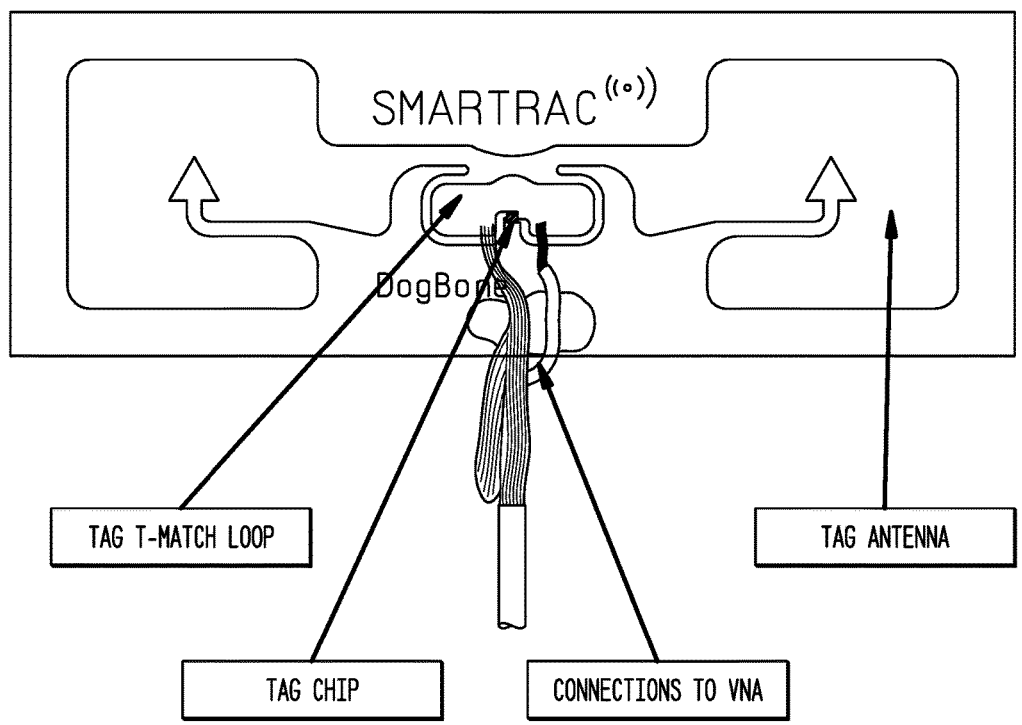

FIG. 7(A), and FIG. 7(B) are photo-illustrations showing Vector Network Analyzer (VNA) measurement in which: FIG. 7(A) shows the VNA experimental setup and FIG. 7(B) shows a customized dogbone RFID tag for VNA experiment according to aspects of the present disclosure. FIG. 7(B) shows the modified tag used for our VNA measurements. Using this setup, we can induce electrical currents within the RFID antenna, and directly measure the impedance in the antenna.

Figure 8A:
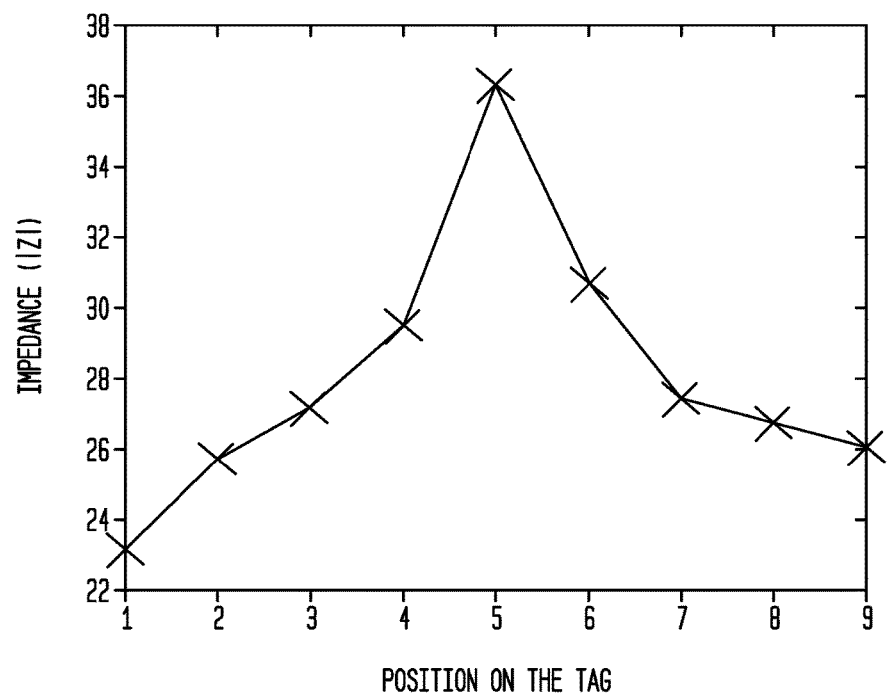
Figure 8B:
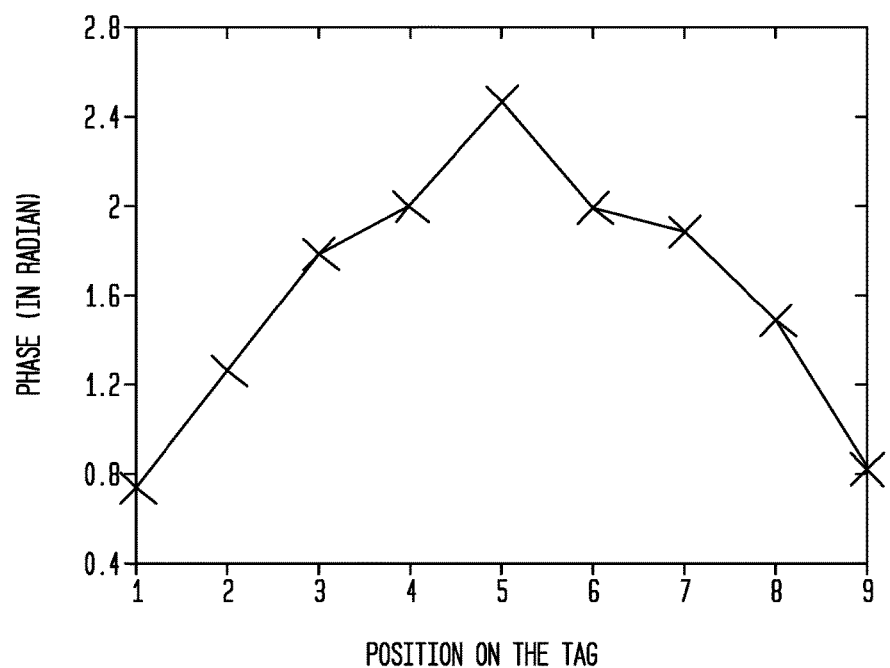

We again divide the tag into 9 equal subsections, and measure the impedance of the antenna when human touch is applied to each of the 9 points. FIG. 8(A), and FIG. 8(B) are graphs illustrating VNA experimental results in which: FIG. 8(A) shows the Impedance vs. Position on Tag and FIG. 8(B) shows Phase (radians) vs. Position on Tag according to aspects of the present disclosure. These figures show the magnitude and phase of this measured impedance. Observe that the impedance change also follows a symmetric bell-shaped pattern, with the largest magnitude and phase changes occurring when the human touches the middle of the tag.

Human Touch on a Multi-Tag Array

Mutual coupling between one or more RFID tags in close proximity can distort the phase and magnitude of the backscattered signal during a swipe gesture.

Figure 9A:
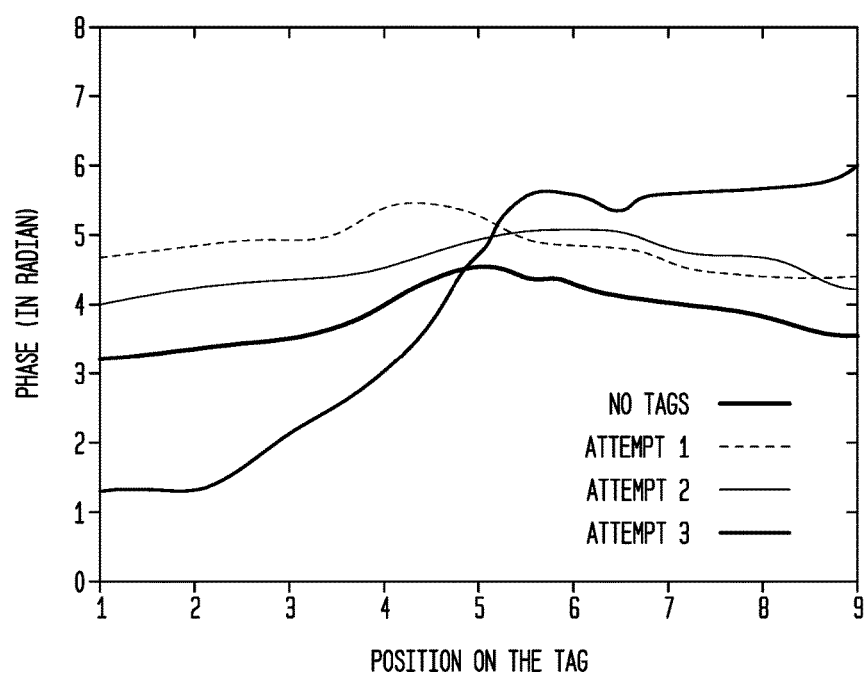
Figure 9B:
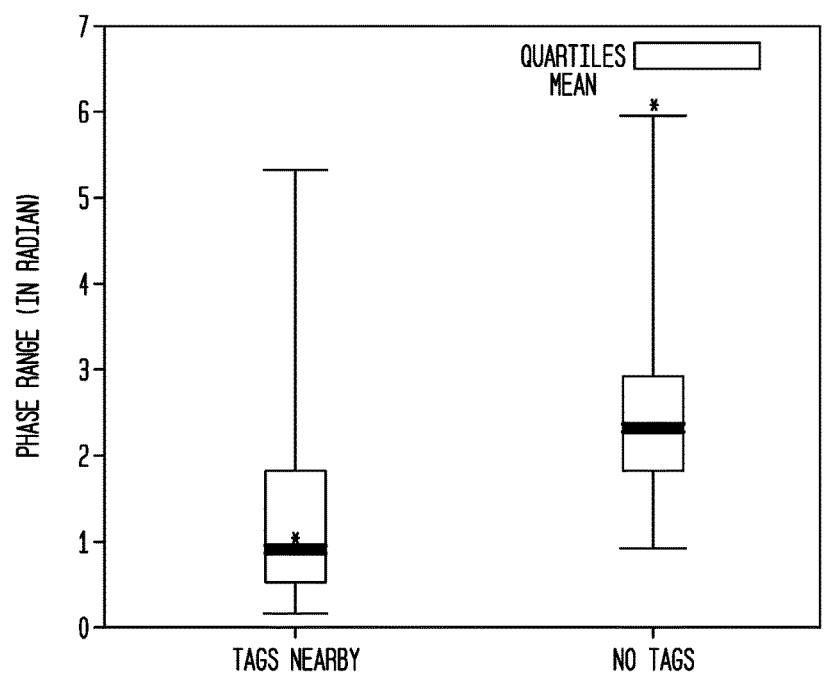

FIG. 9(A), and FIG. 9(B) are graphs illustrating phase behavior with or without nearby tags in which: FIG. 9(A) shows effect of mutual coupling distorting swipe phase behavior and FIG. 9(B) shows effect of mutual coupling reducing dynamic range of phase change according to aspects of the present disclosure.

For example, FIG. 9(A) shows the phase trends of four swipe events over a single RFID tag when (a) there are no other tags in close proximity, and (b) three examples when there is one other tag placed 5 mm away from it.

Observe that due to mutual coupling, the phase can even be almost invariant at several tag locations when one other tag is adjacent (e.g. positions 6 to 9 in FIG. 9(A) for "w/ adj tag 3"). In the other two swipes with adjacent tags, the dynamic ranges of phase changes reduce to around 0.9 radian. This is equivalent to a reduction in the signal-to-noise ratio (SNR) of the phase data obtained by the RFID reader. Furthermore, FIG. 9(B) illustrates that dynamic range of phase change in both halves of the curve for mutual coupling scenarios is on an average 1 radian less than the case when no tag is nearby. This poses a challenge for RIO as a low SNR phase data is correlated with worse finger tracking accuracy. To overcome this challenge, we now try to understand how mutual coupling between tags affects our primitive.

Inverted Phase Behavior.

Figure 10:
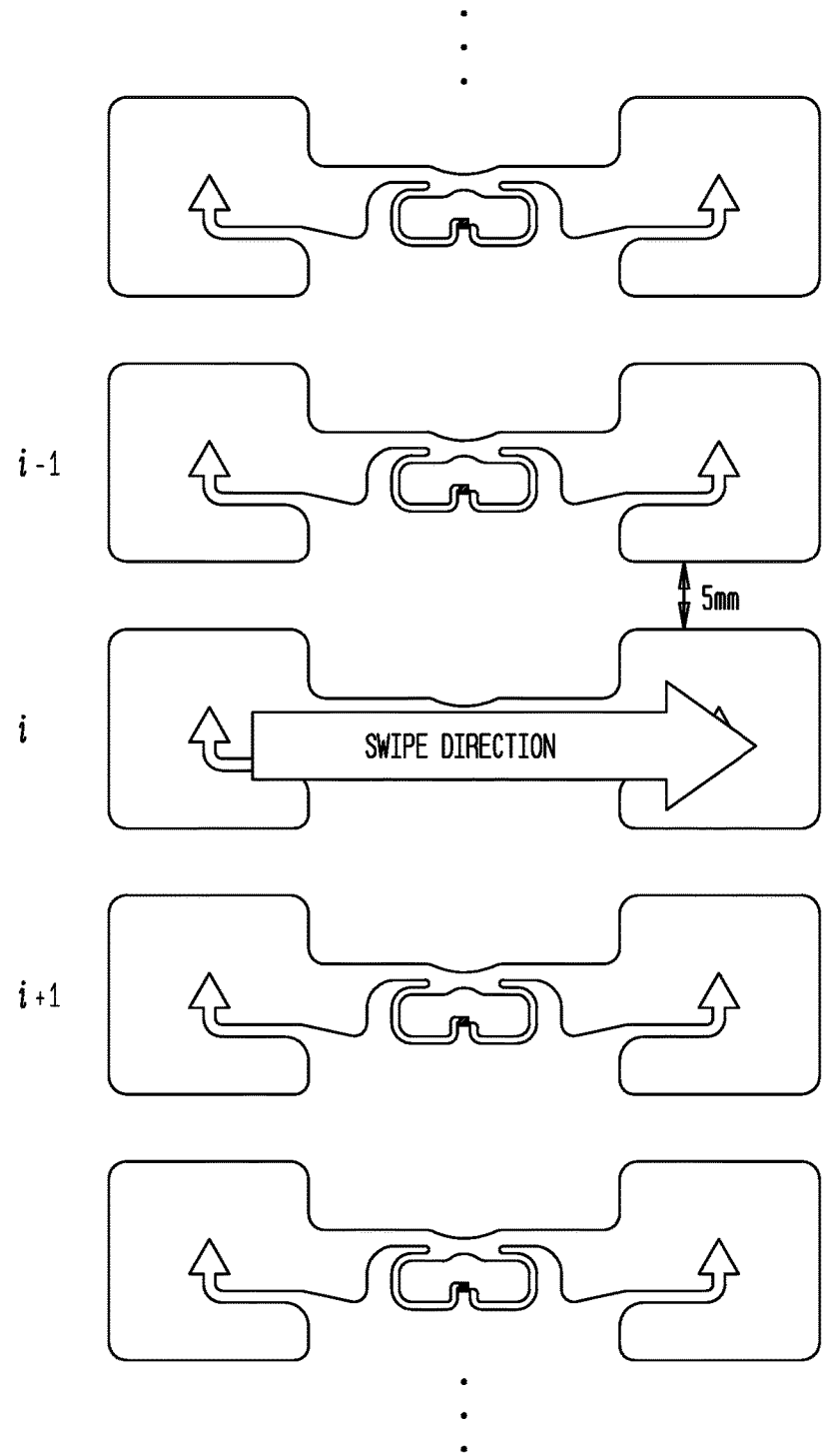
FIG. 10 illustrates tag array for mutual coupling measurement according to aspects of the present disclosure.

Our experiments show that due to mutual coupling, when human touch is applied to a tag, the trend of its own phase change is the opposite of those seen in adjacent tags. FIG. 10 shows the tag layout used in this experiment, with each pair of adjacent tags separated by 5 mm. To highlight the effect of mutual coupling, we consider only three tags in this array, labeled I−1, i and i+1. We swipe across tag i and record the phase of tags i−1, i and i+1.

Figure 12:
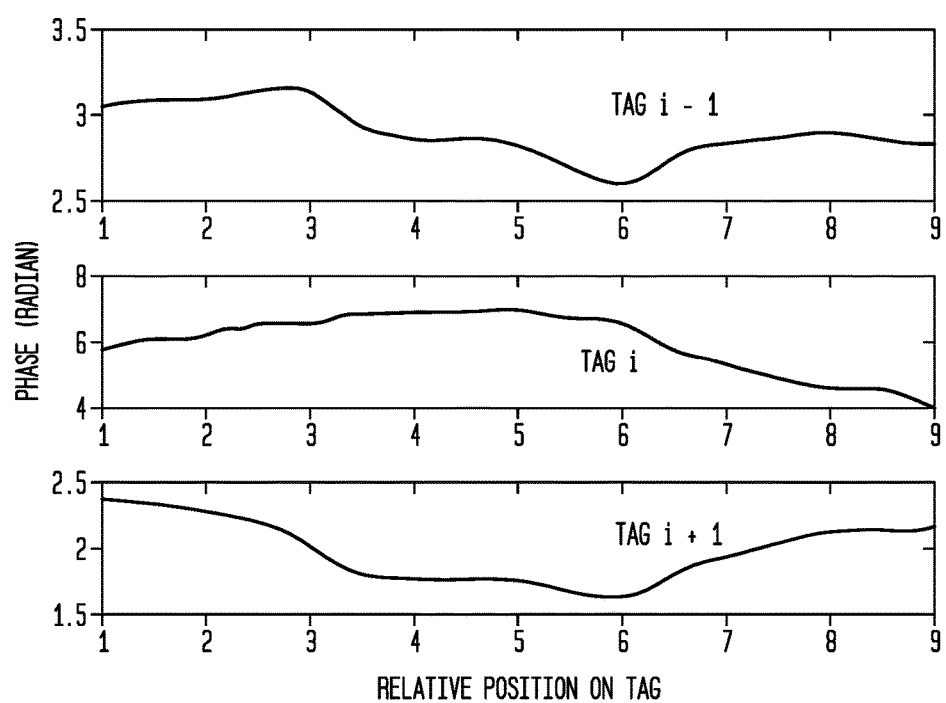
FIG. 12 is a graph illustrating phase change trends in tags i−1 and i+1 according to aspects of the present disclosure.

FIG. 12 shows the phase of the backscatter signal measured from these three tags. Observe that due to mutual coupling, tag i experiences a smaller range (around 2 radian lesser) of phase variations during the swipe gesture. However, the trend of the phase changes shows an interesting pattern: observe that as the swipe gesture moves across tag i, an increase in its phase coincides with a decrease in the phase of tags i−1 and i+1. We refer to this phenomenon as the inverted phase behavior of adjacent tags. Note that the impact of such mutual coupling diminishes as we consider tags that are farther away than the adjacent tags.

Why is the Trend of Phase Changes in Adjacent Tags Inverted?

Figure 11:
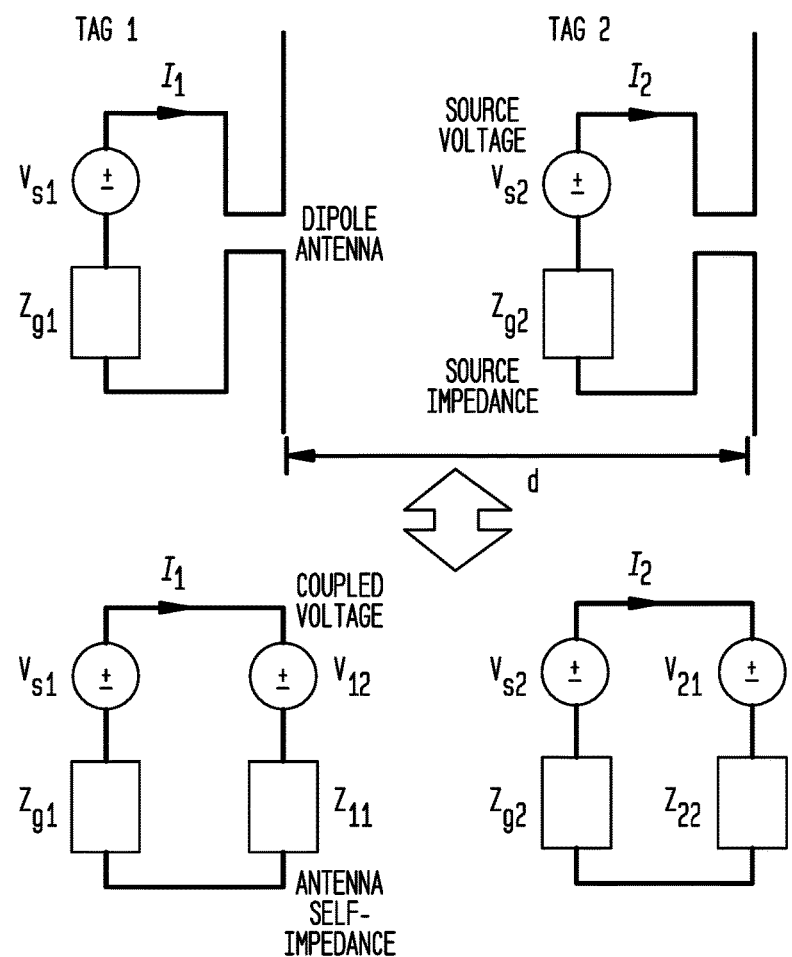
FIG. 11 illustrates equivalent circuit of gags 1 and 2 according to aspects of the present disclosure.

Model: To under-stand the impact of mutual coupling on tag interaction, we model the basic scenario of coupling between two tags. The equivalent circuit of the two tags can be represented as shown in FIG. 11. Here, $V_{s1}$ and $V_{s2}$ are the equivalent source voltages induced by the reader's signal on the tag antenna, with $Z_{s1}$ and $Z_{s2}$ being the corresponding chip impedances, and $Z_{11}$ and $Z_{22}$ being their respective antenna self-impedances.

The current in tag 1, $I_1$ induces a magnetic field, which couples tag 1 and tag 2, thereby inducing a coupled voltage in tag 2, $V_{21}$, where $V_{21}=I_1 Z_{21}$, and $Z_{21}$ is the mutual impedance in tag 2 due to tag 1. Similarly, we have the coupled voltage in tag 1 as $V_{12}=I_2 Z_{12}$. Now, taking mutual coupling into account, the resulting voltages, for tag 1 and tag 2 respectively, can be written as, $$I_1(Z_{11}+Z_{s1})=V_{s1}+I_2 Z_{12}$$

$$I_2(Z_{22}+Z_{s2})=V_{s2}+I_1 Z_{21} \qquad (2)$$

When a tag is interrogated, the back-scattered field (signal) from a tag is a function of the current in the tag. Hence, it suffices for the analysis to focus on the currents in the two tags to understand how interacting with one tag changes the current in the mutually coupled tag. Solving for the two currents in Equation 2, we get $$I_1 = \frac{V_{s1}\tilde{Z}_{22} + V_{s2}Z_{12}}{\tilde{Z}_{11}\tilde{Z}_{22} - Z_{12}Z_{21}}; I_2 = \frac{V_{s2}\tilde{Z}_{11} + V_{s1}Z_{21}}{\tilde{Z}_{11}\tilde{Z}_{22} - Z_{12}Z_{21}} \qquad (3)$$

where $$\tilde{Z}_{11} = Z_{s1} + Z_{11} \text{ and } \tilde{Z}_{22} = Z_{s2} + Z_{22}.$$

Phase Change During Tag Interaction:

Note that we are interested in modeling the change in phase of the signal received by the reader when a user is interacting with the tag being interrogated or a nearby tag. When a tag is interrogated, the signal received by the reader is a combination of the backscattered signal from the desired tag as well as the scattered signal from the other tags (which serve as simple scatterers). We will assume that the contribution of the scattered signals is negligible relative to that of mutual coupling from nearby tags. In this case, the phase of the received signal can be estimated from the phase of the current of the backscattered signal, while accounting for mutual coupling with nearby tags. The phase of the currents in the two tags, $I_1$ and $I_2$, can be written as:

$$\angle I_1 = \phi_1 - \phi_m, \text{ and } \angle I_2 = \phi_2 - \phi_m$$

where $\phi_1$, $\phi_2$ and $\phi_m$ are the phases of $(V_{s1}Z_{22}+V_{s2}Z_{12})$, $(V_{s2}Z_{11}+V_{s1}Z_{21})$, and $(Z_{11}Z_{22}-Z_{12}Z_{21})$ respectively.

Figure 13:
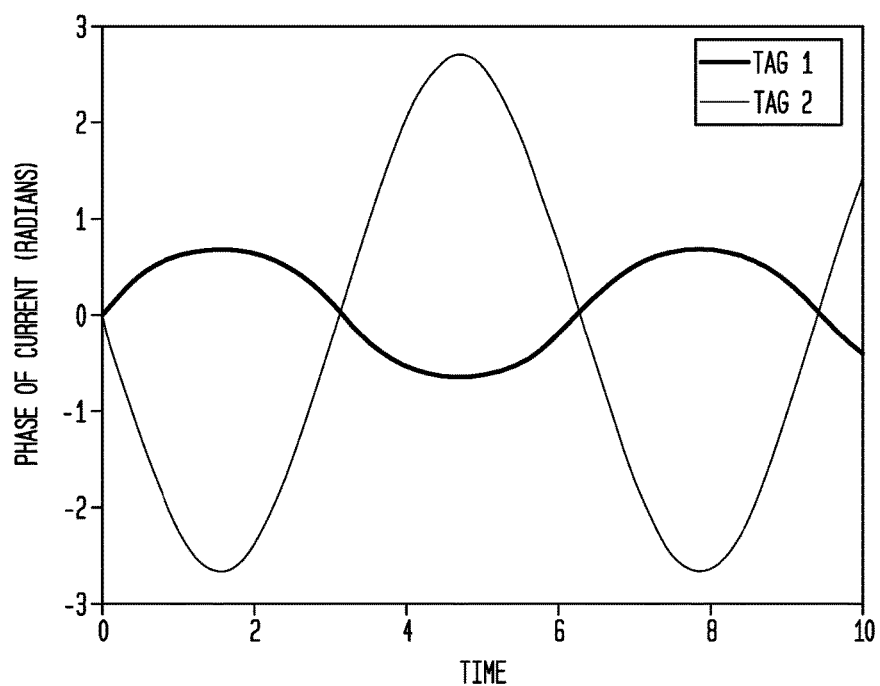
FIG. 13 is a graph illustrating phase of induced current in tags 1 and 2 according to aspects of the present disclosure.

Now, let us consider the case when the user interacts (touching or swiping) with tag 2. This will change the self impedance of $Z_{22}$ as well as its coupled impedance $Z_{12}$ on tag 1, while the chip impedances $Z_{s1}$, $Z_{s2}$ and tag 1's self ($Z_{11}$) and induced ($Z_{21}$) impedances will not change. Hence, while phases $\phi_1$ and $\phi_m$ will change, $\phi_2$ will remain constant. The phase-change behavior can now be captured as $$\angle I_1(t)=\phi_1(t)-\phi_m(t)$$

$$\angle I_2(t)=\phi_2-\phi_m(t)$$

where, $\phi_1(t)=\angle(V_{s1}Z_{s2}+V_{s1}Z_{22}(t)+V_{s2}Z_{12}(t))$ $\phi_m(t)=\angle(\tilde{Z}_{11}Z_{s2}+\tilde{Z}_{11}Z_{22}(t)-Z_{21}Z_{12}(t))$ From the above equation, it can be observed that $\phi_1(t)$ and $\phi_m(t)$ are essentially functions of the same impedance changes, namely $Z_{22}(t)$ and $Z_{12}(t)$. However, the change in $Z_{12}(t)$ has an opposite effect in $\phi_1(t)$ compared to that in $\phi_m(t)$. This contributes to a counter-acting effect on the phase change of $I_1(t)$ compared to $I_2(t)$ (i.e. tag being touched), and results in the inverted phase-change behavior between the tags. To highlight this impact, we plot the phase evolution of $I_1(t)$ and $I_2(t)$ in FIG. 13. Here, $Z_{22}(t)$ is assumed to vary as a sine function during human interaction (for illustration), while $Z_{12}(t)$ is assumed to vary proportionally to $Z_{22}(t)$ (in both magnitude and phase), and rest of the non-varying complex quantities are assumed to be real with unit magnitude.

Thus, while leveraging the primitive for tracking could lead to reduced accuracy in the presence of mutual coupling, the above measurements and analysis highlight the predictable impact of mutual coupling on our primitive. Hence, by leveraging the phase-change behavior across neighboring tags jointly, our primitive can be made robust to mutual coupling in multi-tag settings.

RIO Design

Leveraging the above characteristics of the primitive, we now design the algorithms needed to track the path of the human finger during a swipe gesture across a single isolated tag, and across any individual tag within a tag array. Note that for the sake of simplicity, RIO only tracks a continuous, one-direction swipe across a tag starting from location 1 and ending at 9, as shown in FIG. 4(B). This is not a fundamental limitation of RIO, and the algorithms can be extended to support arbitrary touch movement within a tag Finger Tracking on a Single RFID Tag Single-tag swipe tracking is done in two stages. RIO first detects a touch event on the tag. Once a touch is detected, RIO uses an online tracking algorithm, R-SINGLE, to track the position of a human finger across the single tag. A simple, low-overhead calibration is first performed on a tag that is attached to a surface to determine the precise characteristics of the bell-shaped phase trend. This calibration overhead is small and needs to be performed only once after the tag is first installed. RIO then uses a tracking algorithm based on segmental dynamic time warping (SDTW) that allows for good tracking accuracy with only limited calibration overhead.

Low-Overhead Tag Calibration.

Tag calibration has to be conducted once after the tag is installed on a surface. During tag calibration, the user swipes his/her finger across the surface of the RFID tag at constant speed (as constant as possible), while the Impinj R420 RFID reader continuously reads the tag at a rate of 200 reads/second, and records the phases of all backscatter responses. RIO normalizes the phase responses w.r.t. the lowest value according to the following:

$$p(x) = r(x) - \min_x r(x), \quad 0 \le x \le L \quad (5)$$

where r(x) is the unnormalized (i.e. raw) phase values at location x from the calibration swipe across a tag of length L. RIO then uses polynomial curve-fitting to find the fourth-order polynomial that best describes the normalized calibration data.

Overhead.

This calibration is repeated four (4) times. RIO uses the average of the four polynomial curves in the next touch detection/tracking step. This low-overhead calibration step is (a) not user-specific, and (b) only specific to the installed location of the tag. Hence, each installed tag only needs to be calibrated once before touch tracking is enabled for all users thereafter. Due to human limits, it is not possible to replicate a swipe with a human finger precisely. We have empirically determined that the average of four swipes is sufficient to capture the key behavior of an actual human swipe. We have validated this by having one person calibrate the tag, and evaluating the tracking accuracy of RIO with fifteen (15) other human individuals. Our tracking error remains under 4% for all the sixteen (16) individuals. Note that, we do not need to re-calibrate RIO if only the reading angle of the antenna or the tag changes. However, if there is some considerable change in the environment (e.g., introduction of more blockage due to new furniture or more dynamic paths due to increased movements of people), we need to recalibrate to create the basic phase trend to achieve accurate tracking.

RIO-SINGLE Algorithm.

RIO uses a two-stage approach to finger tracking. RIO continuously reads the RFID tag until it detects a touch event. Once a touch has been detected, RIO switches to a tracking stage where it tracks the position of the finger as it is swiped across the RFID tag.

Touch Detection.

A touch event results in a significant change in the phase of the response signal from the tag. RIO queries the tag continuously and finds the average signal phase over every time interval of T seconds. If a significant change is seen from one time interval to the next (a change larger than a threshold C), then a touch event has occurred and RIO switches to a tracking mode. RIO uses a threshold of C=0.9 radians, which is empirically determined to provide 100% detection accuracy in real-world conditions.

Touch Tracking.

RIO updates the location of the finger during a swipe gestures using a segmental dynamic time warping (SDTW) search algorithm. A good overview of SDTW can be found in other references. Broadly speaking, SDTW compares two sequence segments by stretching and squeezing (i.e., warping) one of the sequences until an optimal match between them is found. The measure of similarity of between these two sequences at this optimal match is returned by the SDTW algorithm.

Figure 14:
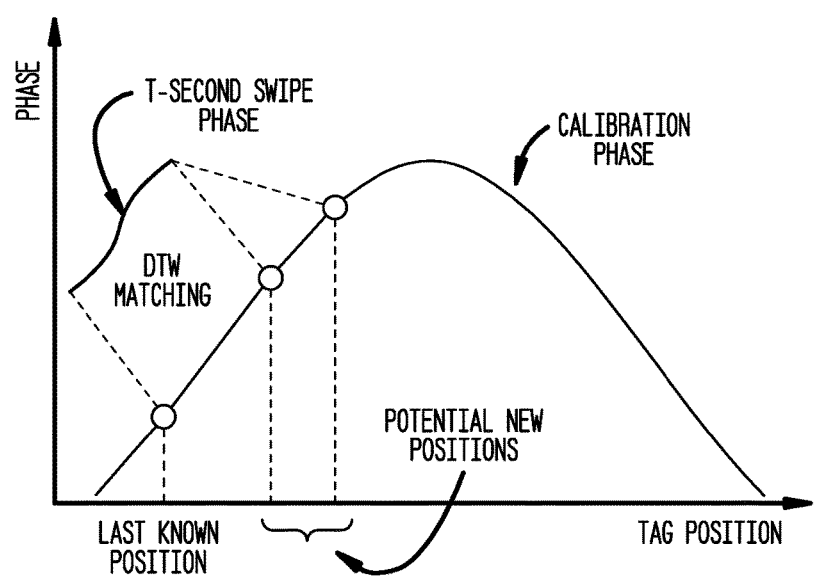
FIG. 14 is a graph illustrating DTW search applied to each window of phase samples during a swipe gesture according to aspects of the present disclosure.

FIG. 14 illustrates how RIO updates the estimated location of the finger in real-time. RIO first collects a sequence of phases of all backscatter responses over a time window of T seconds. Starting from the previously estimated position of the finger, RIO begins a DTW matching by warping the collected sequence and comparing it against multiple segments of the calibration phase data. These segments start from the last known position of the finger, and have varying lengths that span the range of potential new positions, as shown in FIG. 14. The segment with the best match is chosen, and its corresponding end position is taken as the new position of the finger.

This search-and-update step is continuously repeated as RIO tracks the finger over the surface of the tag. The details of the touch detection and tracking algorithms are described in Algorithm 1.

---

Algorithm 1 RIO-SINGLE

---

1: $x_0 \leftarrow$ current finger location;
2: $x_{max} \leftarrow$ max finger location w.r.t. $x_0$;
3: $x_{min} \leftarrow$ min finger location w.r.t. $x_0$;
4: $p(x) \leftarrow$ calibration data (from Eq. (8));
5: procedure DTW(a, b)
6:   return DTW distance between sequences a and b;
7: procedure MINDTW($x_0$, $x_1$, w, p(x))
8:   $p \leftarrow \{p(x)|x_0 \le x \le x_1\}$;       ▷ Segment of calibration phase data between $x_0$ and $x_1$
9:   return DTW(w, p − p($x_0$));
10: procedure GETPHASEDATA
11:   $t_0 \leftarrow$ CURRENTSYSTEMTIME;
12:   $t \leftarrow t_0$; w ← EMPTYVECTOR,
13:   while $t \le t_0 + T$ do
14:     $t \leftarrow$ CURRENTSYSTEMTIME;
15:     w ← APPEND(W, CURRENTPHASEREADING);
16:   return w − min(w);
17: procedure UPDATELOCATION($x_0$, w)
18:   $x_{new} \leftarrow \arg\min_{xmin<x<max}$ MINDTW($x_0$, x, w);
19:   return $x_{new}$;
20: procedure TOUCHDETECTION
21:   while True do
22:     w ←GETPHASEDATA;
23:     if mean(w) > C then return True.
24: procedure TOUCHTRACKING
25:   while True do
26:     w ←GETPHASEDATA;
27:     $x_0 \leftarrow$ UPDATELOCATION($x_0$, w);
28: TOUCHDETECTION( ); TOUCHTRACKING( );

---

RIO estimates the finger location after every time interval T seconds. The choice of T determines the latency and processing overhead of each location estimate. In our implementation of RIO, we use T=0.5 s as we have empirically determined it to be suitable for a typical swiping speed. We have evaluated the performance of RIO for other values of T and found the performance to be similar.

In Algorithm 1, RIO performs a DTW search over a range of segment sizes, as specified by $x_{min}$ and $x_{max}$ in Algorithm 1. Note that $x_{min}$ and $x_{max}$ determine the lower and upper ranges of swipe gesture speeds that will be accurately tracked by RIO. The greater the value of $x_{max}$ the higher the upper bound of this speed limit. Similarly, the smaller the value of $x_{min}$, the slower the lower bound on the speed limit. We select $x_{min}$ and $x_{max}$ to correspond to 0.5 T and 1.5 T seconds of calibration data respectively, which is equivalent to a swiping speed of 10 to 15 mm/s.

Computation Overhead.

Figure 24:
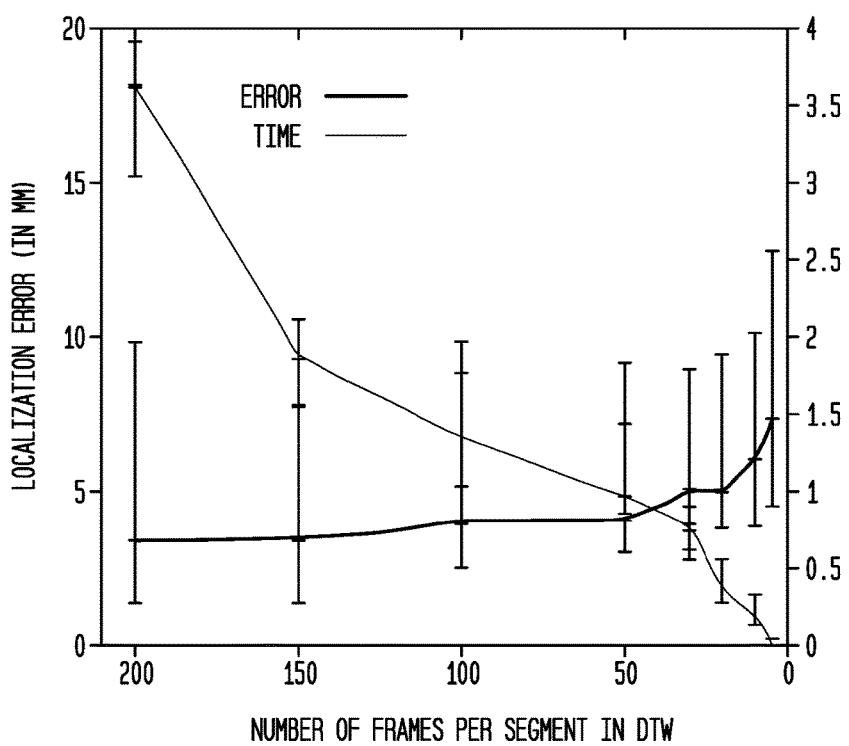
FIG. 24 is a graph illustrating tracking resolution vs computational overhead according to aspects of the present disclosure.

The computational overhead of finger tracking is dominated by the DTW algorithm, which has a complexity of $O(N^2)$. In practice, RIO samples M equally spaced sample sizes from the range of $x_{min}$ and $x_{max}$, and performs a location update (procedure L in Algorithm 1) over these M samples. The larger the number of samples M, the finer the tracking resolution. However, the overhead of the corresponding search will also be significantly greater. By default, RIO uses M=200 to achieve high accuracy. However, our empirical evaluations, as shown in FIG. 24, show that we can reduce M to 50 with only a slight reduction in accuracy, but gain a 4× reduction in computation delay. With M=50, each full tracking update step can be accomplished in under a second, thus enabling real-time tracking of the finger position. Hence, an interface that is built with RIO can tune M to match the desired accuracy-overhead trade-off.

Finger Tracking on a Multi Tag Array

We consider the tag array layout as illustrated in FIG. 10. RIO tracks a finger on a multi-RFID tag array with two steps. RIO first identifies the tag that the finger is touching, while accounting for mutual coupling. Once RIO determines the tag that is touched, it uses a multi-tag tracking algorithm (using neighboring tags) to continuously localize the finger during the swipe gesture.

Tag Calibration. As in the single tag case, calibration must be performed on the tag array only once after installation. RIO collects and normalizes the phases as the user swipes his/her finger across each tag in the array, as shown in FIG. 10. We use pi(x), . . . , $p_N(x)$ to refer to the normalized phases from the N tags in the array.

RIO-Multi Algorithm. Touch Detection.

Touch detection operates on the backscatter phase from all N tags over a time window T. We use $w_1, \ldots, w_N$ to refer to these N vectors of phase data. Informally, RIO determines the total change in phase encountered by each tag over this time window. It then searches for the tag triple (or tag pair, in the case of the tags at either ends of the array) that best demonstrates the inverted phase behavior as described earlier: for a given tag i, the change in phase of its neighboring tags i−1 and i+1 are the inverse of its own.

Algorithm 2 shows the pseudo-code for touch detection. The PhaseDiff procedure determines the phase changes over the window of phase data. RIO smoothes out the noise in the phase data by fitting the best line through the phase data using linear regression. The phase change of each tag, is the difference between the two extreme points on the line. RIO computes a weighted sum of the phase change of each tag i and its neighboring tags as $m_i = \alpha d_i - \beta(d_i-1+d_i+1)$. By selecting weights α and β with opposite polarity, RIO can capture the effect of the inverse phase behavior of tag triples (or tag pairs). Empirically, we have found that the touch and tracking accuracy of RIO is best when α=0.8 and β=0.2.

---
Algorithm 2 RIO-MULTI: Touch Detection
---

```
 1:    procedure PHASEDIFF(w)
 2:        s ← LINEARREGRESSION(w)
 3:        return max{s} − min{s}
 4:    procedure TOUCHDETECT(w_1, ..., w_N, L)
 5:        for i = 1, ..., N do
 6:            d_i ← PHASEDIFF(w_i)
 7:        for i = 1, ..., N do
 8:            if i = 1 then
 9:                m_i ← ad_i − βd_{i+1}
10:            else if i = N then
11:                m_i ← ad_i − βd_{i−1}
12:            else
13:                m_i ← ad_i − β(d_{i−1} + d_{i+1})
14:        i^{(1)} ← argmax m_i
                i ∈ {i, ..., N}
15:        return i^{(1)}
```

Touch Tracking.

Figure 15:
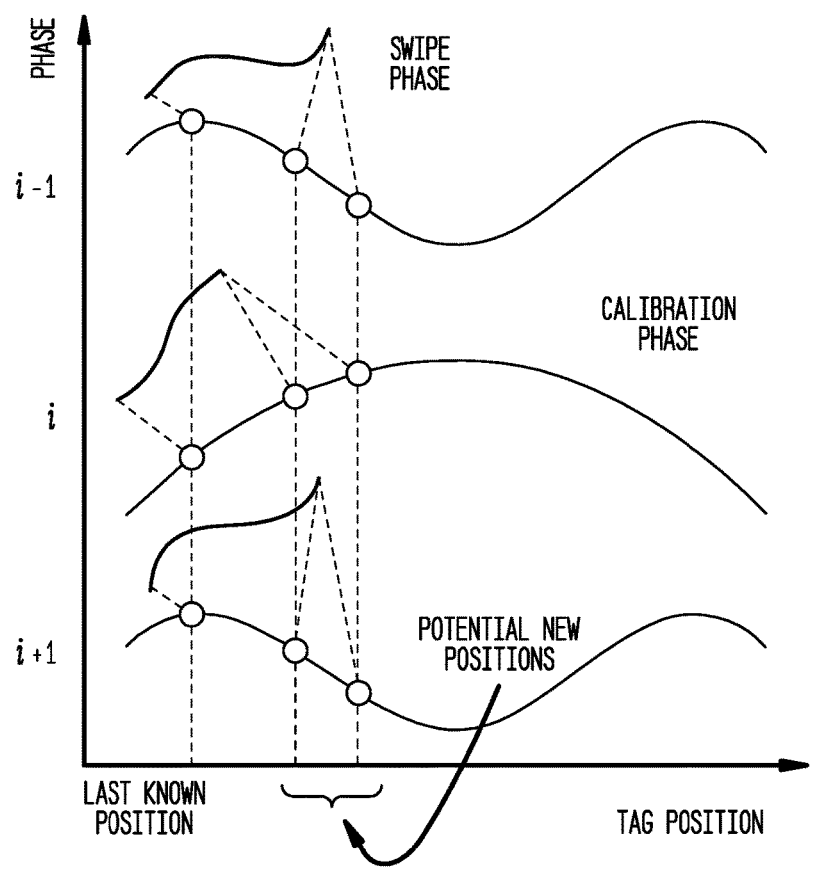
FIG. 15 is a graph illustrating DTW search across adjacent tags according to aspects of the present disclosure.

Once RIO has determined the specific tag that is being touched, it immediately begins reading phase data from that tag i, along with tags that are directly adjacent to it, tags i−1 and i+1 (if any). FIG. 15 illustrates how the segmental DTW search is extended to support two adjacent RFID tags. RIO conducts concurrent DTW searches on these three tags (or two tags, if i is an edge tag), using the same segment sizes for each step in the DTW search. The segment size that best matches the phase data from the three tags will indicate the new finger location Algorithm 3 shows the multi-tag tracking algorithm. The MDTW procedure performs the multi-tag DTW search jointly on sets of three adjacent tags and combines the results using the weighted metric $h = \alpha\, g_i + \beta\, (g_{i-1} + g_{i+1})$ where $g_i$, $g_{i+1}$ and $g_{i-1}$ is the DTW distance of tag i, i−1 and i+1 respectively. This metric identifies segments that not only match the phase pattern in the desired tag but also the inverted phase pattern in the adjacent tags, to boost the tracking accuracy. The segment identified in the L procedure is used to update the new location of the finger during the swipe. As before, RIO runs this search-and-update procedure continuously to track the location of the finger.

utilizing the PHY-layer filtering feature of the RFID Class 1 Generation 2 (C1G2) protocol to read only subsections of the array at a time. After RIO MULTI detects the tag that is being touched, RIO applies the RFID filter to read up to eight tags around the tag that is touched (four on either side). The RIO-MULTI touch tracking then tracks the swipe gesture on the touched tag.

Extending Rio with Custom Designed RFID Tags

COTS RFID tags are designed primarily for communications, and hence, the antennas are typically dipole antennas, and have sizes and shapes that are carefully tuned to match the electrical impedance of the RFID chip. The limited variety in antenna designs restricts the range of user interfaces that can be built using COTS tags. In this section, we discuss RIO's potential by exploring how it can operate with custom-built RFID tags of varying shapes and sizes. This will allow the user interfaces built using our touch primitive to be better customized to the specific demands of smart spaces.

Constructing Custom RFID Tags.

Figure 16A:
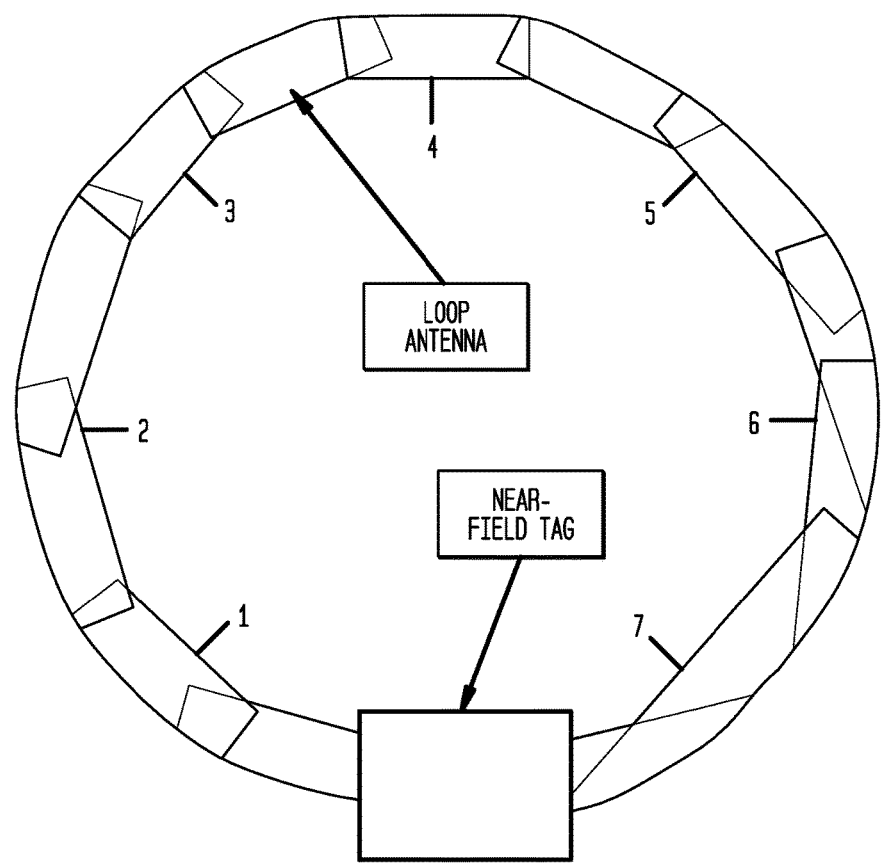
Figure 16B:
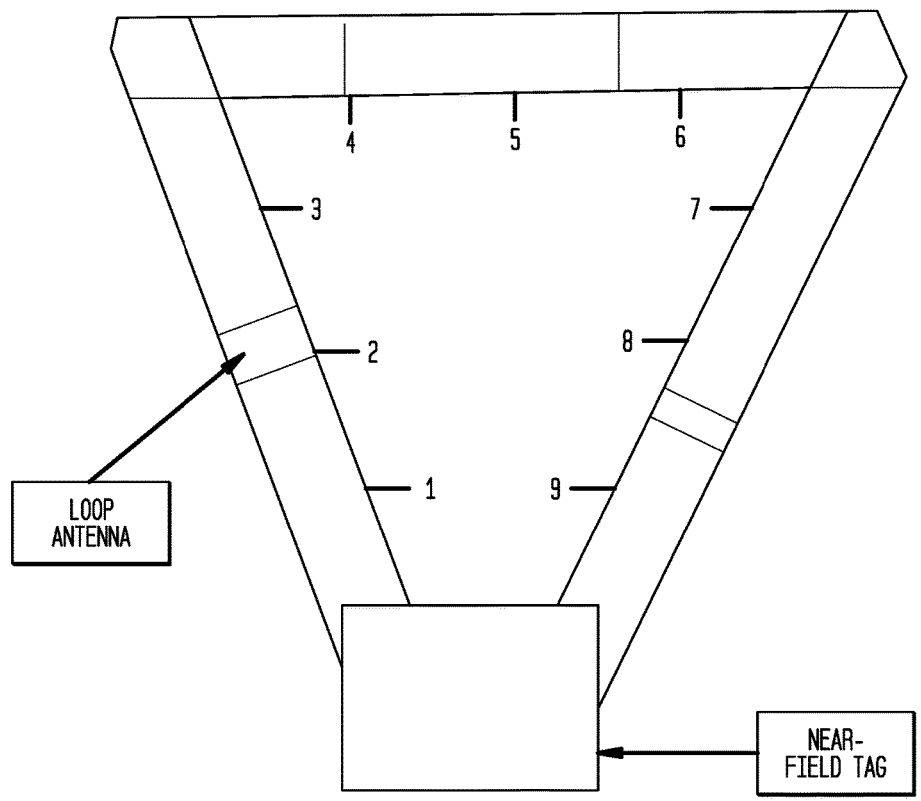

We extend RIO to support custom-designed RFID tags, two of which are shown in FIG. 16. FIG. 16(A), and FIG. 16(B) are photo-illustrations showing custom-designed RFID tags in which: FIG. 16(A) shows a circle custom tag and FIG. 16(B) shows a triangle custom tag according to aspects of the present disclosure.

The antenna of the tags are constructed using copper metal tape, arranged in shapes that can better mimic familiar control interfaces. For example, FIG. 16(A) shows a circle RFID antenna that resembles a round control knob. A user can swipe in either clockwise or counter-clockwise directions to adjust the music volume, or light brightness etc. Owners of the iPod Classic with the click wheel will and this interface familiar. A small near-field RFID tag with an adhesive side is attached to the custom-built antenna, as shown. The antenna forms an inductively coupled connection with the near-field RFID tag, and touching the antenna ---
Algorithm 3 RIO-MULTI: Touch Tracking
---

```
 1:  x_0 ← 0                                    ⊳ Current finger location
 2:  w_1, ..., w_N ← GETALLPHASEDATA
 3:  i_{max} ← TOUCHDETECT(w_1, ..., w_N, L)
 4:  procedure MINMULTIDTW(x_0, x, w_{i−1}, w_i, w_{i+1})
 5:      g_i ← MINDTW(x_0, x, w_i, p_i)
 6:      g_{i−1} ← MINDTW(x_0, x, w_{i−1}, p_{i−1})
 7:      g_{i+1} ← MINDTW(x_0, x, w_{i+1}, p_{i+1})
 8:      h ← αg_i + β(g_{i−1} + g_{i+1})
 9:      return h
10:  procedure UPDATELOCATION(x_0, w_{i−1}, w_i, w_{i+1})
11:      x_{new} ← argmin MAXMULTIDTW(x_0, x, w_{i−1}, w_i, w_{i+1})
             x_{min} ≤ x ≤ x_{max}
12:      return x_{new}
13:  while TRUE do
14:      x_0 ← UPDATELOCATION(x_0, w_{i_{max}−1}, w_{i_{max}}, w_{i_{max}+1})
15:      w_{i_{max}} ← GETPHASEDATA
16:      w_{i_{max}−1} ← GETPHASEDATA
17:      w_{i_{max}+1} ← GETPHASEDATA
```

Scaling to Larger Multi-Tag Arrays.

RFID readers achieve a constant number of reads/second (200 in case of our Impinj reader), regardless of the number of tags within the read range. Hence, when the array size is very large, the read rate per tag decreases, which reduces the fidelity of the phase data, and consequently the accuracy of both touch and gesture tracking. RIO addresses this by will result in a familiar phase change in the backscattered signal Antenna Design Space.

The antennas shown in FIG. 16 are examples of loop antennas. We use loop antennas because they have the advantage of being easy to construct in various shapes and sizes. Our demonstration only uses basic shapes (a circle and a triangle), but many other antenna structures such as folded dipoles, coil and cloverleafs can be used as building blocks for more complex interfaces.

In order for the antenna to operate at maximum efficiency, the antenna layout must be tuned such that its impedance matches the impedance of the RFID chip. Our custom RFID antennas are designed primarily to mimic real-world control interfaces, and are not impedance-matched to the RFID chip. However, even with this sub-optimality, our experiments show that our custom tags can be read at ranges of up to 1.5 m, which is comparable to the performance of COTS RFID tags 2.4 m. Tracking on Custom Tags.

Figure 17A:
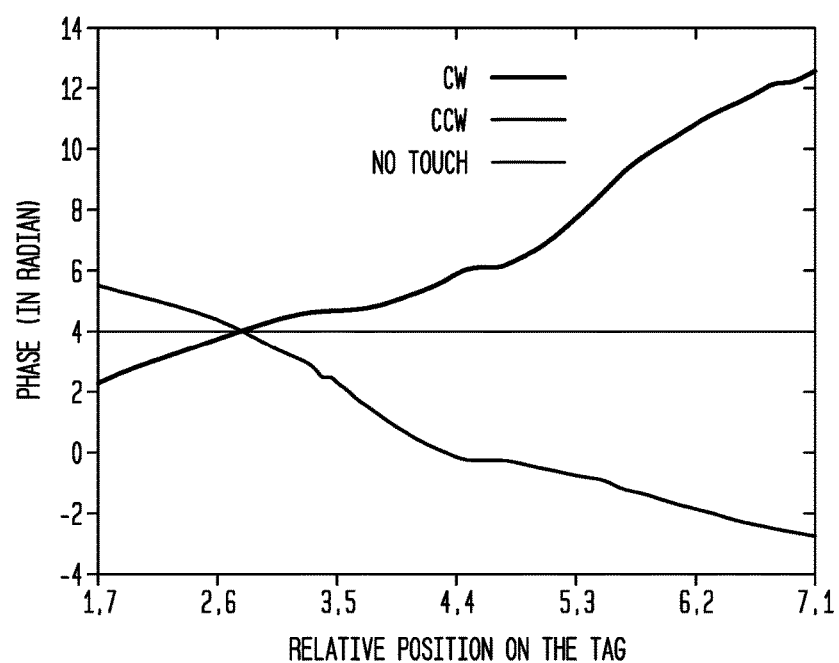
Figure 17B:
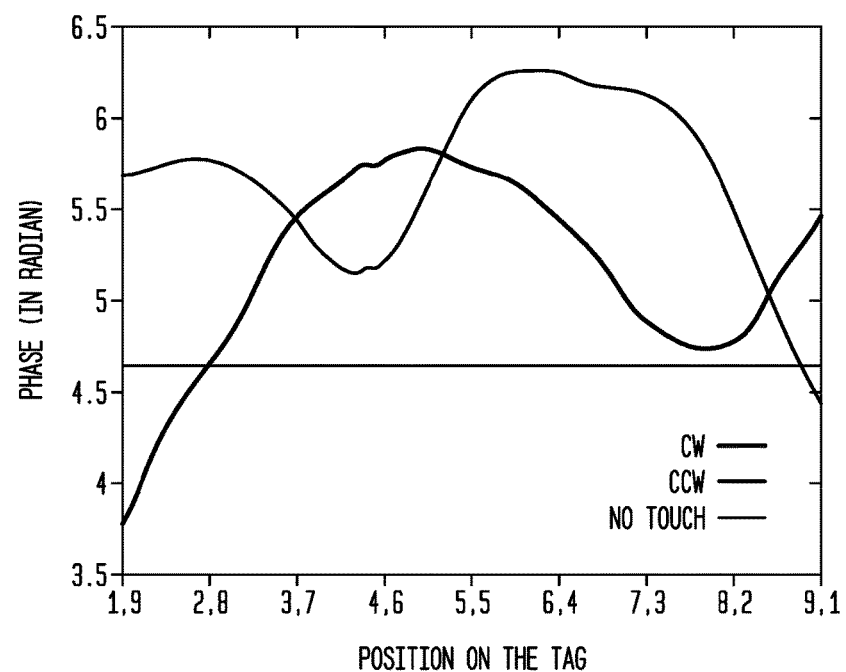

FIG. 17(A), and FIG. 17(B) are graphs illustrating phase trends when a clockwise (CW) and counter-clockwise (CCW) swipe gestures are performed on the custom circle and triangle-shaped RFID tags in which: FIG. 17(A) shows a circle tag graph and FIG. 17(B) shows a triangle tag graph according to aspects of the present disclosure.

Observe that the phase trends show distinctive patterns and large phase variations (similar to those seen in COTS RFID tags) that can aid in accurately locating a finger even in the presence of noise. Thus, the single tag tracking algorithm (Algorithm 1) in R can also be used to track touch/gesture with these custom tags.

RIO Evaluation

In this section, we evaluate RIO using the setup shown previously in FIG. 3(A). We show the performance of RIO with COTS tags, as well as custom-designed tags and highlight its robustness as a battery-free UI primitive. We also propose and evaluate two proof-of-concept applications to demonstrate the utility of RIO.

The RFID setup operates as before, where the Impinj R420 reader continuously queries the tags in range (at about 200 reads/second), and records the RF phase of all RFID responses. We thus have time series of phase readings for each individual tag. The camera is time synchronized with the reader control software, so that the video recording is time synchronized with the RF phase measurements. This video footage is used to determine the tracking accuracy.

COTS Tag Layout.

We demonstrate the swipe tracking accuracy of RIO using the COTS tags. We use two different tag layouts: a single isolated tag, and a multi-tag array, as shown in FIG. 10. This tag layout has two parameters: Tag angle, and distance. Tag angle: FIG. 3(A) shows a setup where the tags are place at on a surface, which is parallel to the plane of the RFID reader antenna. We tilt the reader antenna by elevating one edge of the antenna to vary the angle of the tag(s) w.r.t. the reader antenna. Tag distance: We also elevate the entire tag(s) shown in FIG. 3(A) to vary the distance of the tags to the reader antenna. Experiment result with different tag angle and distance serve to demonstrate the performance of RIO under real-world conditions, when the tag is not perfectly aligned with the antenna.

Custom Tags.

We also evaluate RIO on custom tags, as described previously. These custom tags are arranged 50 cm away from, and parallel to the surface of the reader antenna.

Accuracy Measure.

We use OpenCV on the time-synchronized video footage to visually track the finger during the swipe and touch gestures. At any point in time, we compare the location of the finger as indicated by RIO to its actual finger position as shown by the camera. The tracking accuracy of RIO is reflected in the offset distance (in mm) between these two measurements (RIO and camera).

RIO with COTS Tags

Touch Detection. COTS Single Tag. For single-tag detection, we use the phase change threshold $C=0.9$. With this threshold, RIO achieves perfect touch detection, even under varying tag angles (from 0 to 60°, w.r.t. the reader antenna surface) and tag distances (up to 2.4 m from the reader).

COTS Multi-Tag Array.

Figure 20:
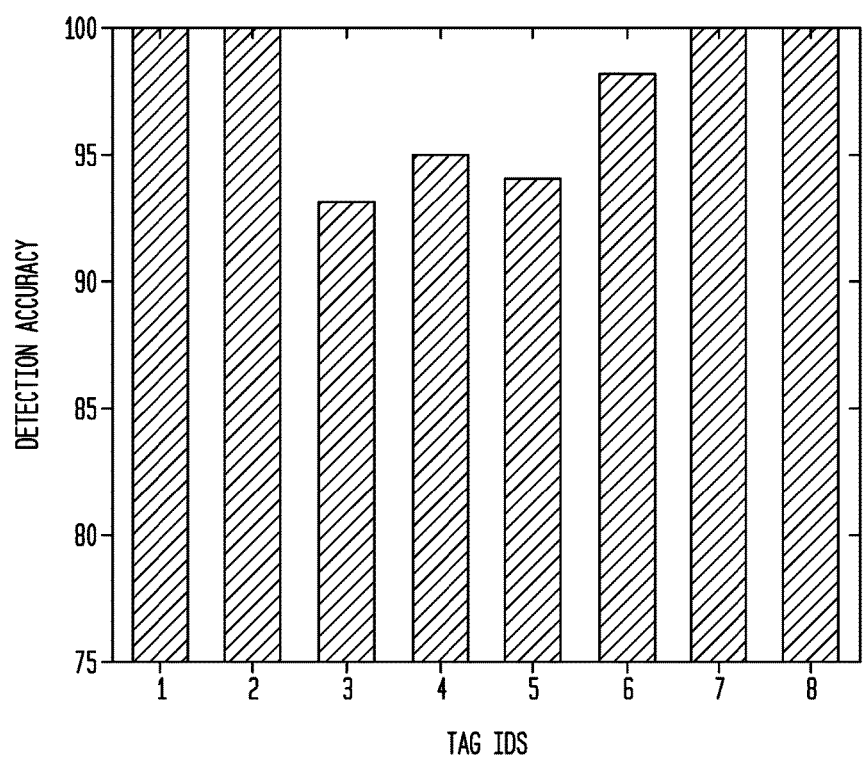
FIG. 20 is a graph illustrating detection accuracy vs. tag ID of touch detection on multi-tag array according to aspects of the present disclosure.

FIG. 20 shows the detection accuracy when we touch each tag in an array of eight tags. Observe that R correctly detects the tag being touched more than 92% of the time. Touch events on tags closer to either ends of the array are even correctly detected 100% of the time. Hence, R provides close to perfect tag detection under real-world conditions, with RFID tags deployed in positions within an envisioned smart space. We expect this accuracy to increase if multiple receive antennas, together with spatial diversity processing (i.e., a multi-static setup) is used.

Touch Tracking. COTS Single Tag.

Figure 18A:
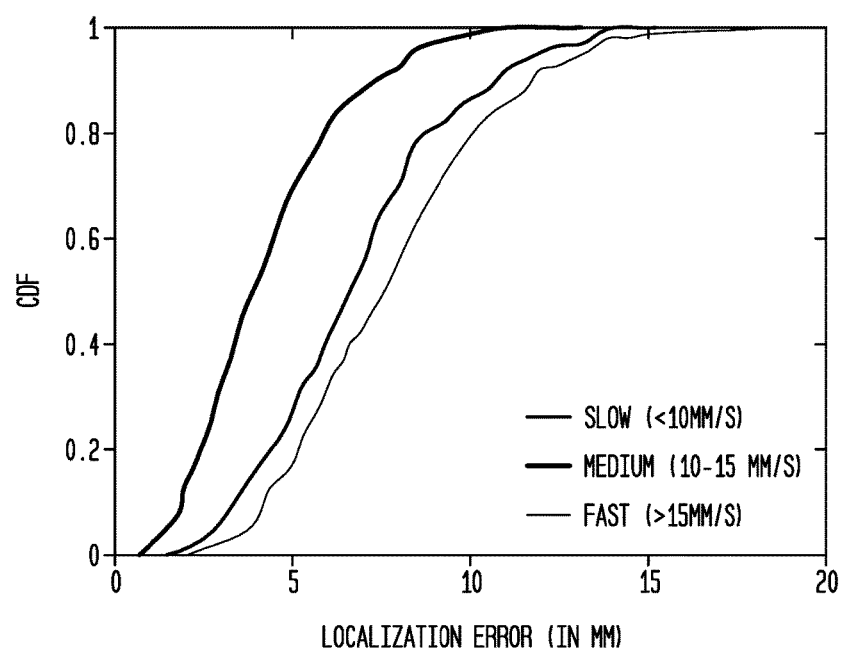

FIG. 18 shows the tracking accuracy distribution of a swipe gesture when the tags are parallel to and at a distance of 50 cm from the reader antenna. The swipe is performed at three different speed ranges: slow (less than 10 mm/s), medium (10 to 15 mm/s) and fast (quicker than 15 mm/s). A swipe at each speed range is repeated 100 times on each tag to obtain this distribution. Recall that the DTW window of 0.5 T to T is chosen for swiping speeds of up to 15 mm/s. Observe that the median location error at medium speed over a single tag, as shown in FIG. 18(A), is 3 mm. Given that the tag is 80 mm in length, this median error is a mere 3.8% of the tag length. The median error with slow and fast swipes is greater, at 7 and 8 mm respectively, but is still within 10% of the tag length.

Figure 19A:
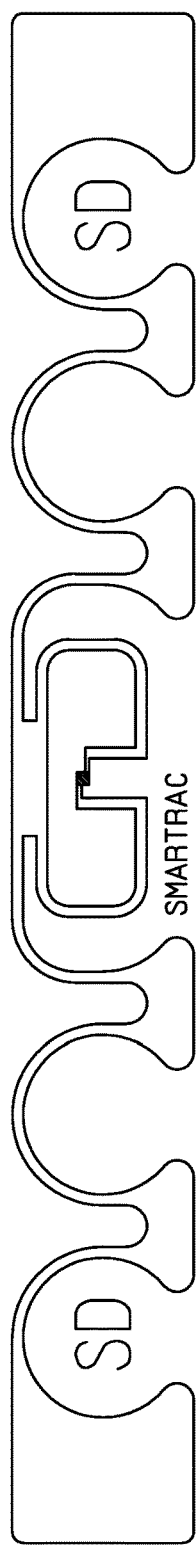
Figure 19C:
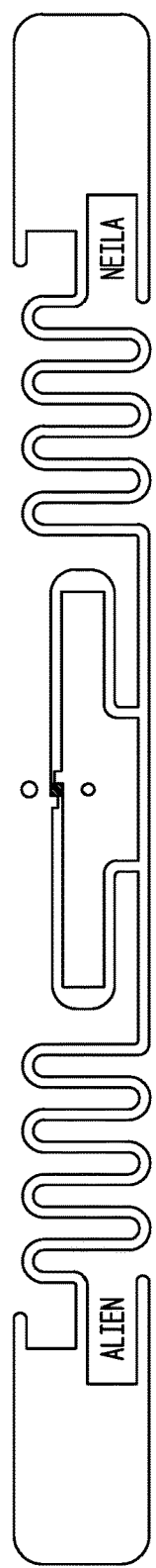
Figure 19D:
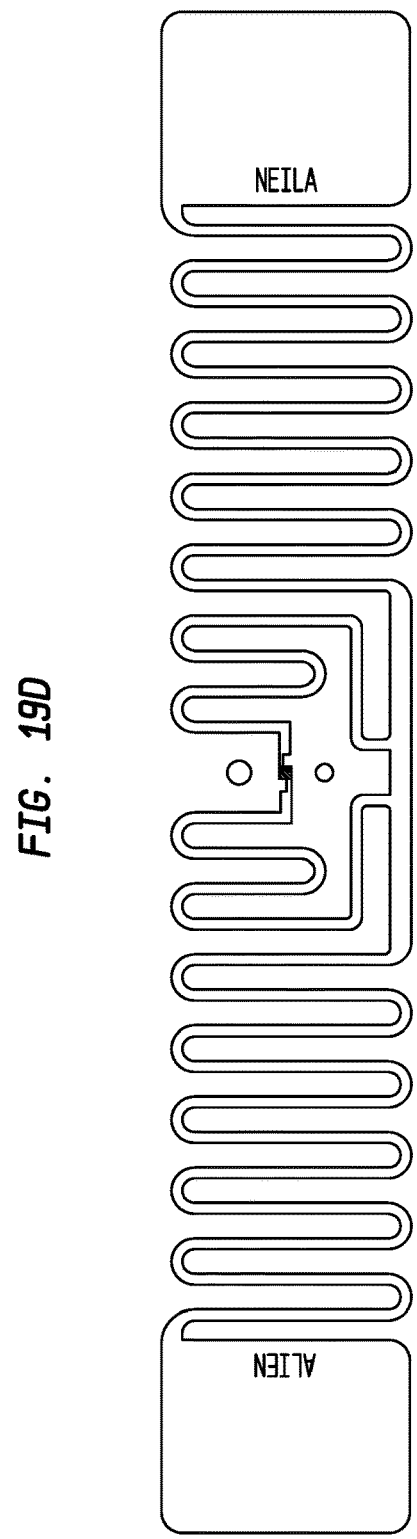
Figure 21:
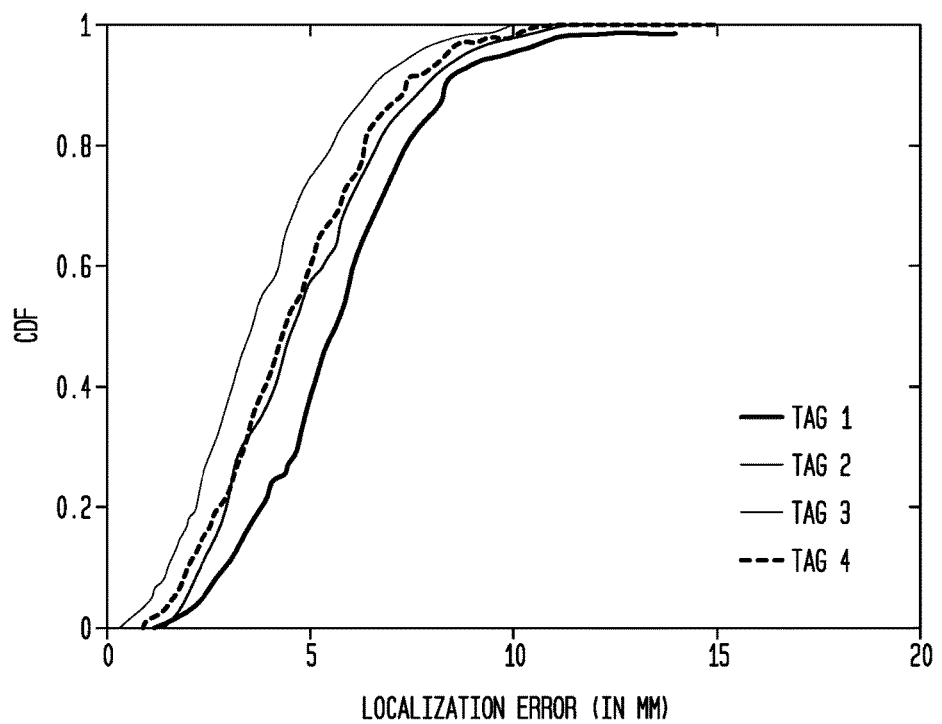
FIG. 21 is a graph illustrating CDF vs. Localization Error of swipe error distribution for 4 other tags (tag 1, tag 2, tag 3, and tag 4) according to aspects of the present disclosure.

This good single tag performance is not limited to our specific RFID tag. To demonstrate this fact, we perform the medium-speed swipe gesture over four other types of tags with different antenna designs and RFID chips, as shown in FIG. 19. FIG. 21 shows that the median tracking error lies between 3 and 6 mm, less than 10% of the tag length.

COTS Multi-Tag Array.

Figure 18B:
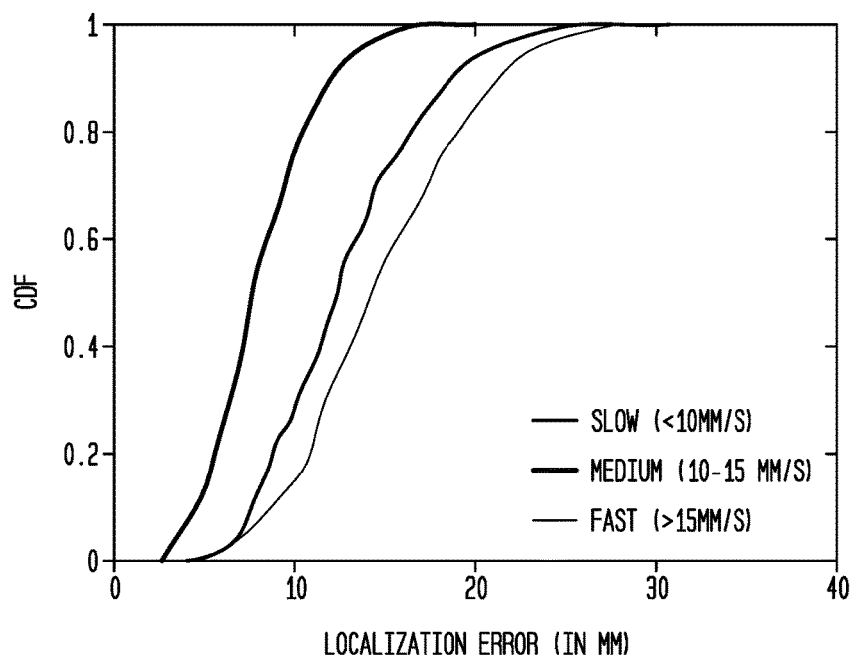

FIG. 18(B) shows the tracking error distribution in an array of eight (8) tags. These results assume perfect touch detection accuracy. Observe that the results show similar behavior to the single-tag case, where the medium speed swipe has this lowest median error of 7 mm, while the slow and fast speeds have median errors of 12 and 14 mm. Hence, even in the presence of mutual coupling effects, RIO can localize the finger to within 10% of the overall tag length. The experiments on both the single and multi-tag arrays demonstrate that R can accurately track the location of a finger during a swipe gesture.

RIO with Custom-Designed Tags

Figure 22:
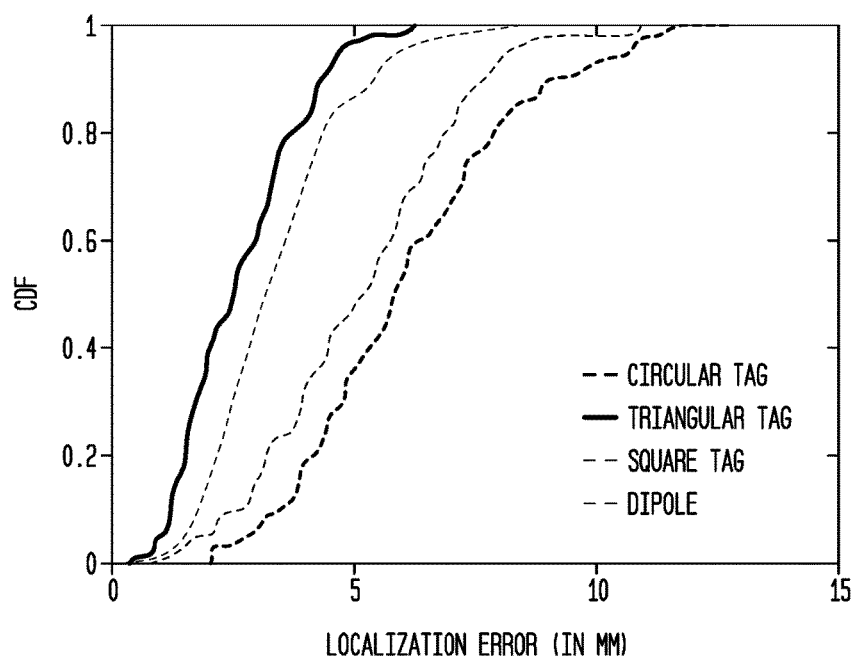
FIG. 22 is a graph illustrating tracking error distribution of custom tag according to aspects of the present disclosure.

We evaluate RIO with four different types of custom tags: the circle and triangle, as shown earlier in FIG. 16, along with a square and dipole that are constructed with the same techniques. We place the smart tags 50 cm away from the reader antenna, and perform a medium-speed swipe gesture. FIG. 22 shows the tracking accuracy distribution when a swipe a performed on each of these four custom tags. Observe that the median tracking error of all four tags is less than 8 mm, which is comparable to that obtained using COTS RFID tags.

Figure 23:
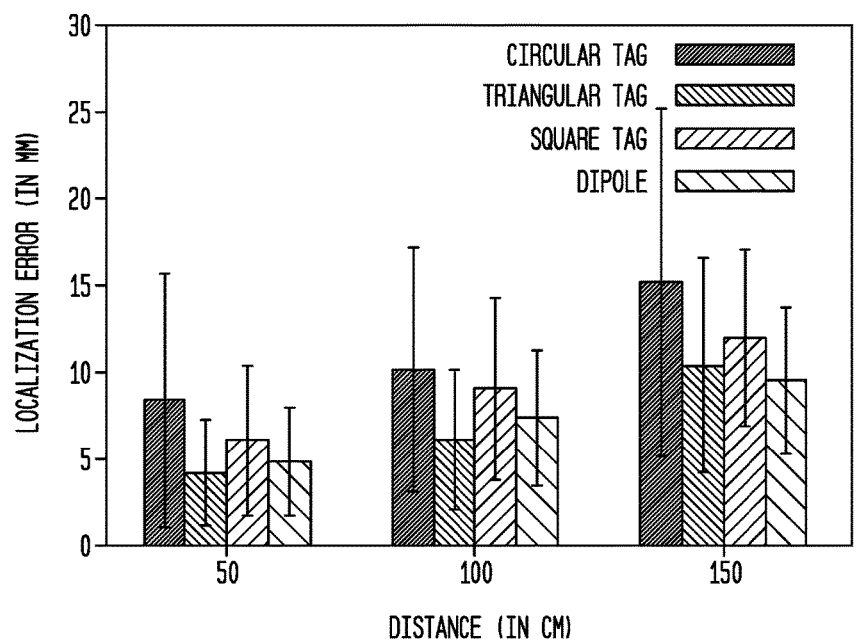
FIG. 23 is a graph illustrating tracking accuracy of custom tags at different distances from reader. error distribution of custom tag according to aspects of the present disclosure.

FIG. 23 shows the localization error distribution when the custom tags are placed at distances up to 1.5 m away from the reader. Observe that even at this distance, the median tracking error is no more than 15 mm, or less than 19% of the tag length. Hence, RIO readily supports custom designed RFID tags that are purpose built for specific smart spaces.

RIO is a Robust Touch-Sensing Primitive

Tracking Resolution vs Computation Overhead. RIO trades off finger tracking resolution and computational overhead through the number of segments, M, used for each location update (procedure L in Algorithm 1) and Algorithm 3. For RIO, we run the data processing and pattern recognition module at an Intel desktop with a 2.93 GHz Core i7 CPU and 16 GB of memory, running Ubuntu 14.04 and JDK8.

FIG. 24 shows this trade-off for several values of M. Observe that M can be chosen to be as low as 50 with only a slight increase in median error (from 3 to 4 mm), while achieving an almost 4× reduction in computation time. At this chosen level of accuracy, RIO has a touch location tracking response time of one second. This computational overhead applies to both single and multi-tag setups. We note that these latencies relates to motion tracking only. A simple single-point touch-event can be detected within several milliseconds RIO on Large Multi-RFID Tag Arrays.

Figure 25:
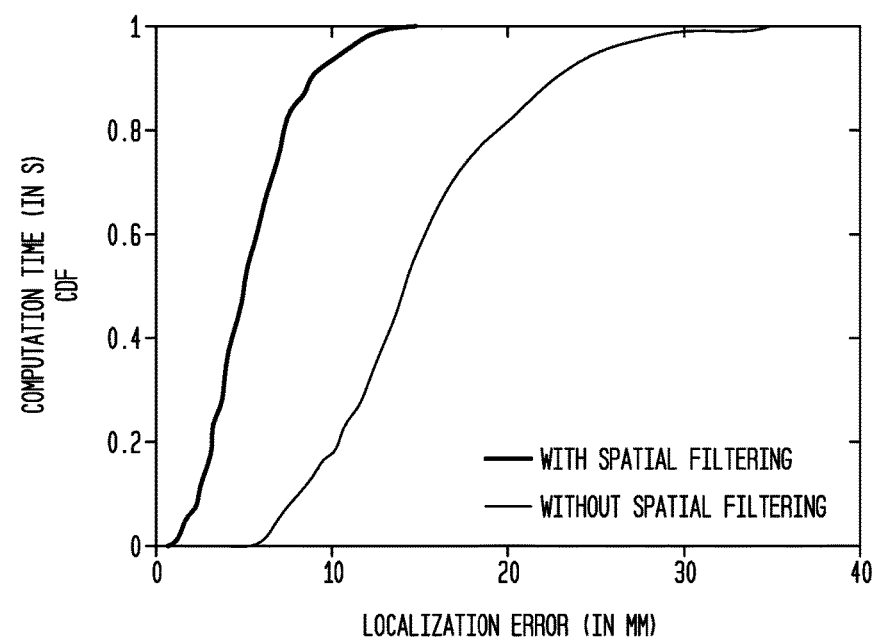
FIG. 25 is a graph illustrating swipe tracking accuracy over an array of 30 RFID tags according to aspects of the present disclosure.

We evaluate the performance of RM with 30 RFID tags, using the same experimental setup as previously. FIG. 25 shows the tracking accuracy distribution of R with and without RFID spatial filtering. Observe that the median tracking error reduces from 14 mm when no spatial filtering is used, to 6 mm when filtering is enabled. Due to the large number of tags, when no filtering is used, there are time windows of T seconds when only a small number of phase data is obtained from the tag being touched. This results in poor tracking accuracy. However, no such abnormalities are observed when PHY-layer tag filtering is used.

Robust Tracking under Varying Tag Tilt Angles.

Figure 26A:
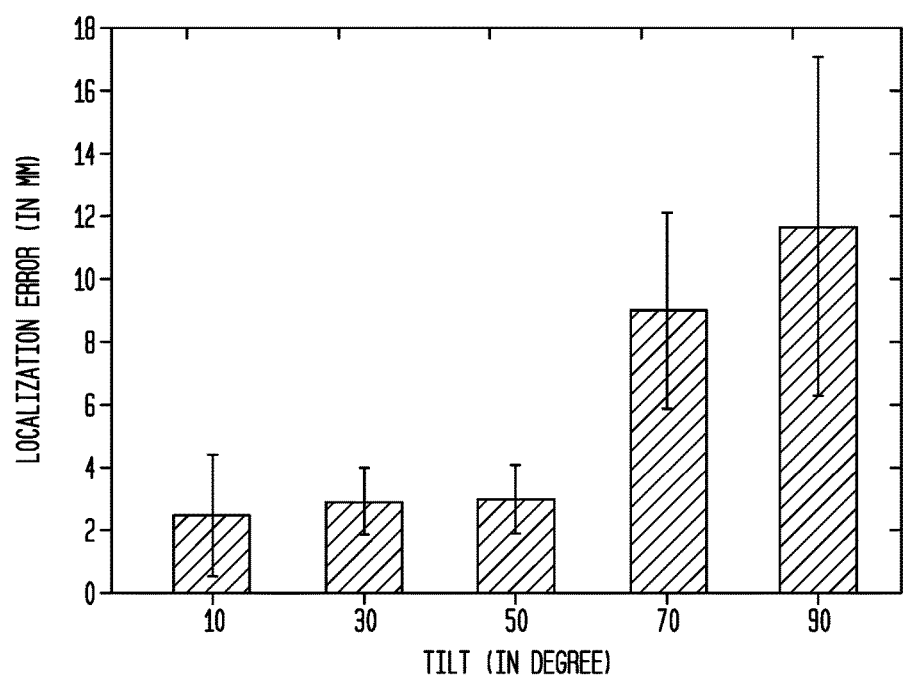
Figure 26B:
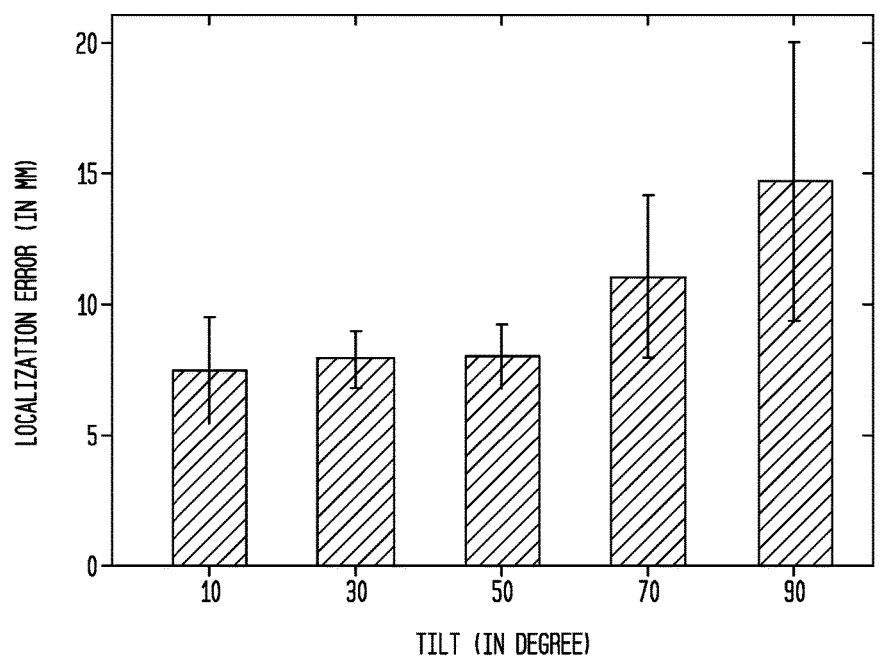

FIG. 26 shows the tracking accuracy of a medium speed swipe when the tags are placed at varying angles w.r.t. the plane of the RFID reader antenna. Observe that in both the single and multi-tag array, RIO can track the finger location with a very small error (at 3 and 8 mm respectively) when the tag is within 50°, of the reader antenna. This is because the RFID tags have linearly polarized directional antennas that focus the backscatter signals within a 120°, beam-width. This result shows that battery-free touch or gesture sensing is robust over a large range of incident angles to the RFID reader. As the tilt angle increases to greater than half the beam-width and the reader antenna moves outside the beam edge of the RFID tag, the tracking accuracy decreases. Note that changing the relative tilt angle of the tag is analogous to the change of the relative angle of the RFID antenna, and will thus yield similar accuracy results.

Robust Tracking at Varying Distances from Reader.

Figure 27A:
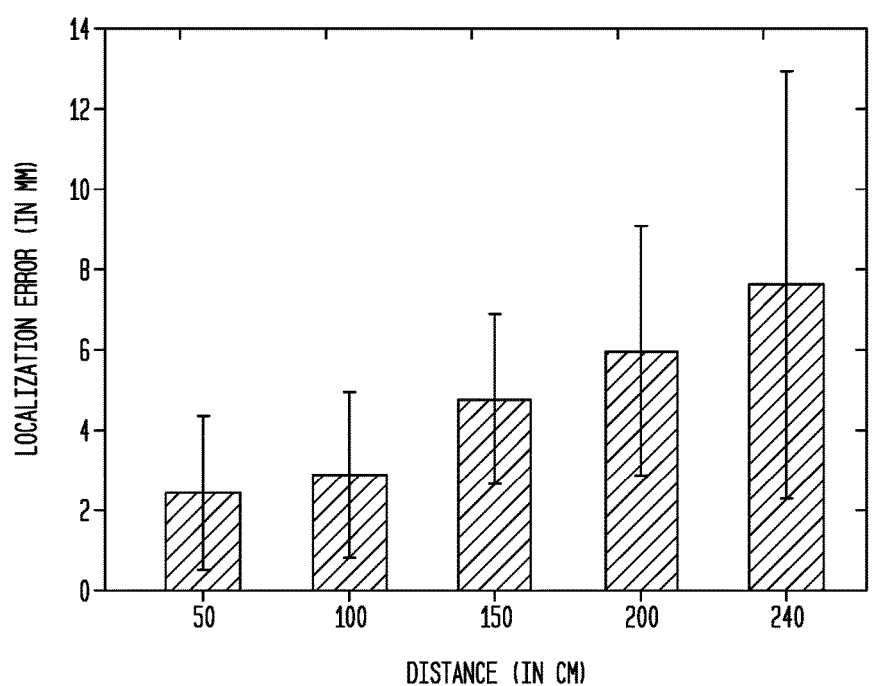
Figure 27B:
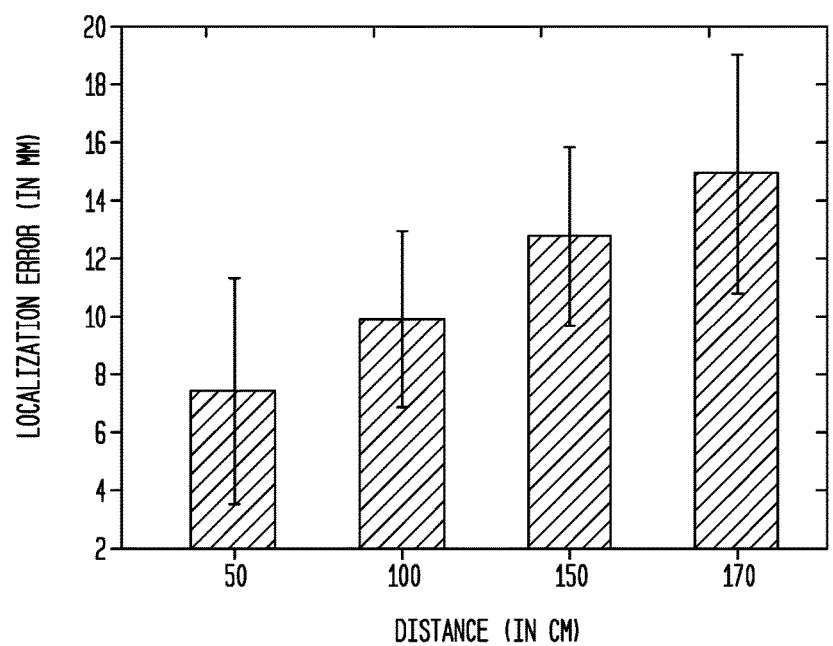

FIG. 27 shows the tracking accuracy when a medium-speed swipe is performed on a tag that is at varying distances from the RFID reader. Observe that in the single tag case, a low error of no more than 8 mm (10% error) is achievable up to 2 m from the reader. This demonstrates that battery-free touch/swipe tracking is robust at varying distances from the reader. However, if we change multiple factors simultaneously (e.g. reading angle, tag tilt, blockage etc.) or we change one of the impacting factor drastically (e.g. sudden increase of people in the room or introducing a new blockage between the tag and the antenna), we need to re-calibrate RIO to create the reference phase pattern to achieve mm-level accuracy.

Proof-of-Concept Applications

RIO is a touch sensing primitive for battery-free UI design. In this section, we describe and evaluate two proof-of-concept UI applications that are built using RIO.

Battery-Free Keyboard.

Figure 28A:
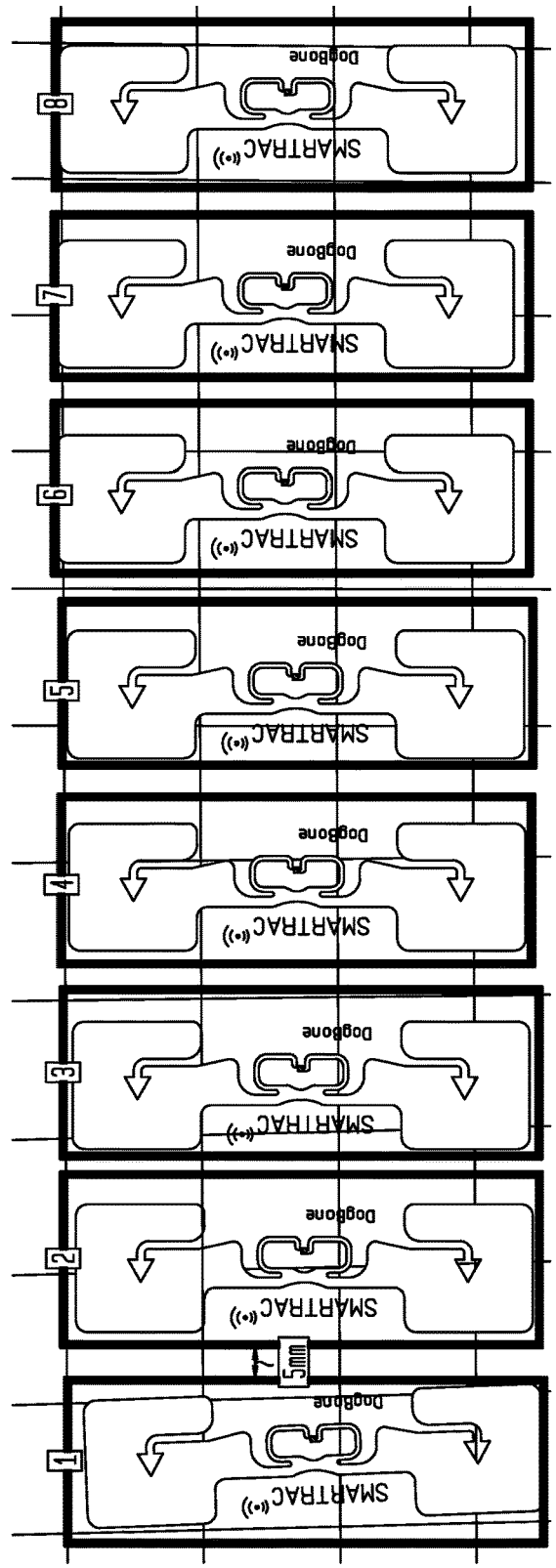
Figure 29A:
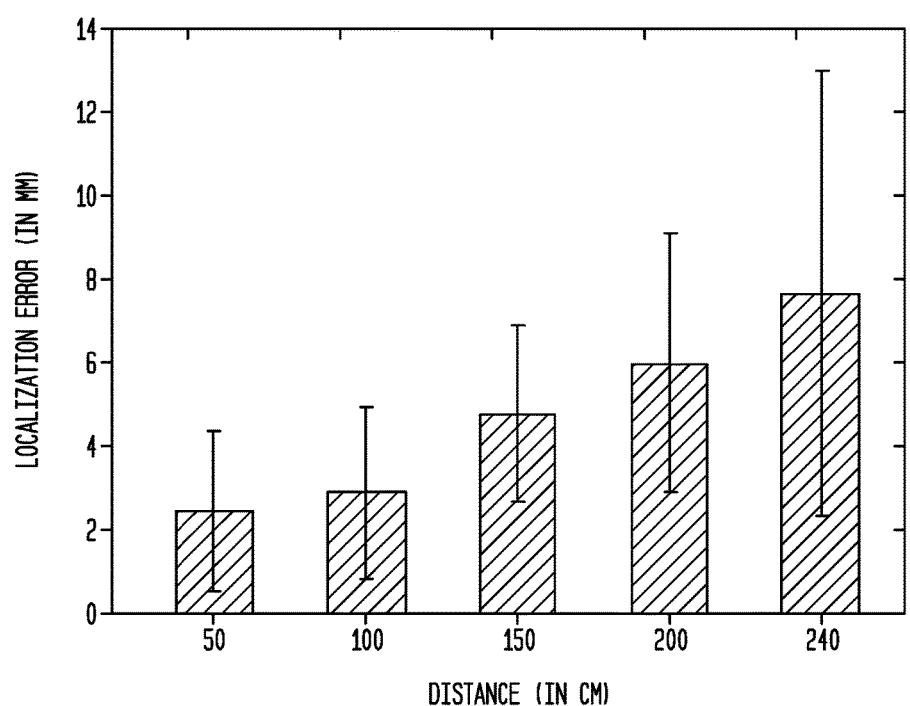

A keyboard directly uses the touch-detection capability of RIO in a multi-tag environment. We used RIO to develop an 8-key musical keyboard (as shown in FIG. 28(A)), along with an accompanying GUI. We can touch multiple keys simultaneously in this musical keyboard application. FIG. 29(A) shows the false positive (tag is mistakenly detected as being touched) and false negative (a touch event on a tag is missed). Observe that our simple threshold based touch detection algorithm achieves high accuracy in this battery-free key detection system, with a total rate of false positive(s) and negative(s) below 10%.

2D Numeric Touchpad.

Figure 28B:
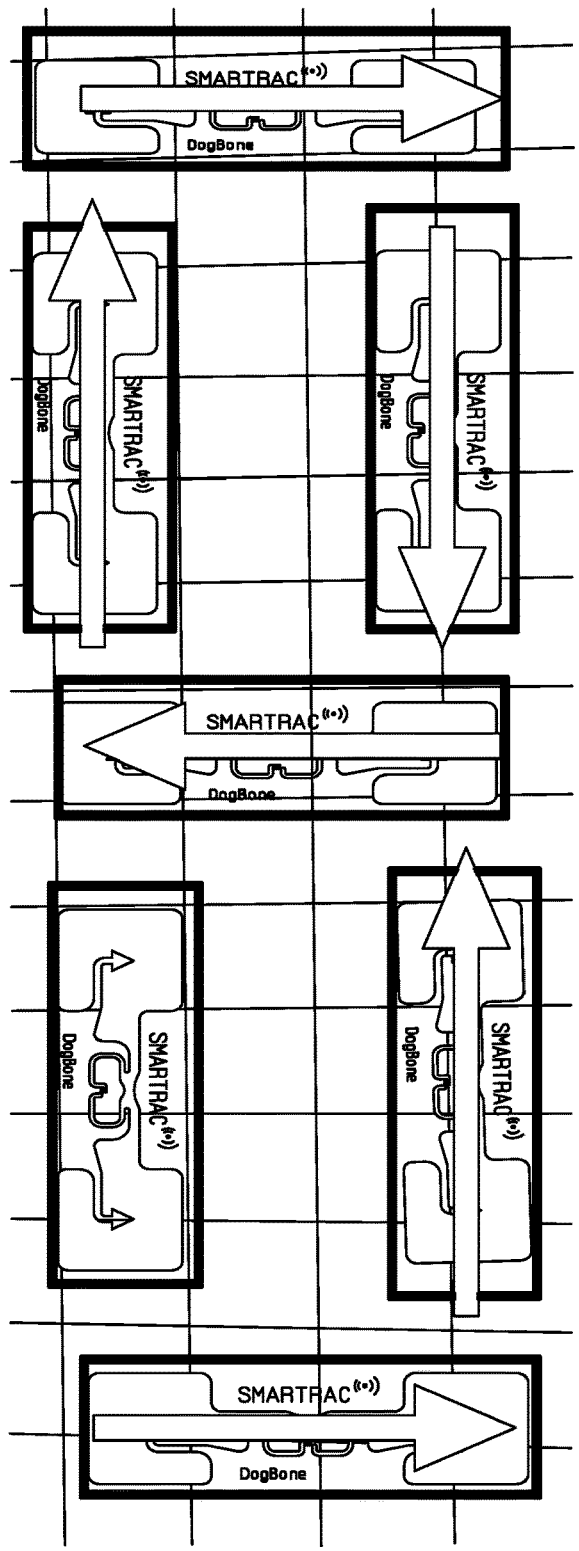

We have constructed a 2D numeric touch-pad, as shown in FIG. 28(B), using 7 COTS RFID tags. Each numeric digit is formed by tracing its shape over the RFID tags. FIG. 28(B) illustrates the outline of the number "6" (shown rotated 90°) traced on the touch-pad.

Figure 29B:
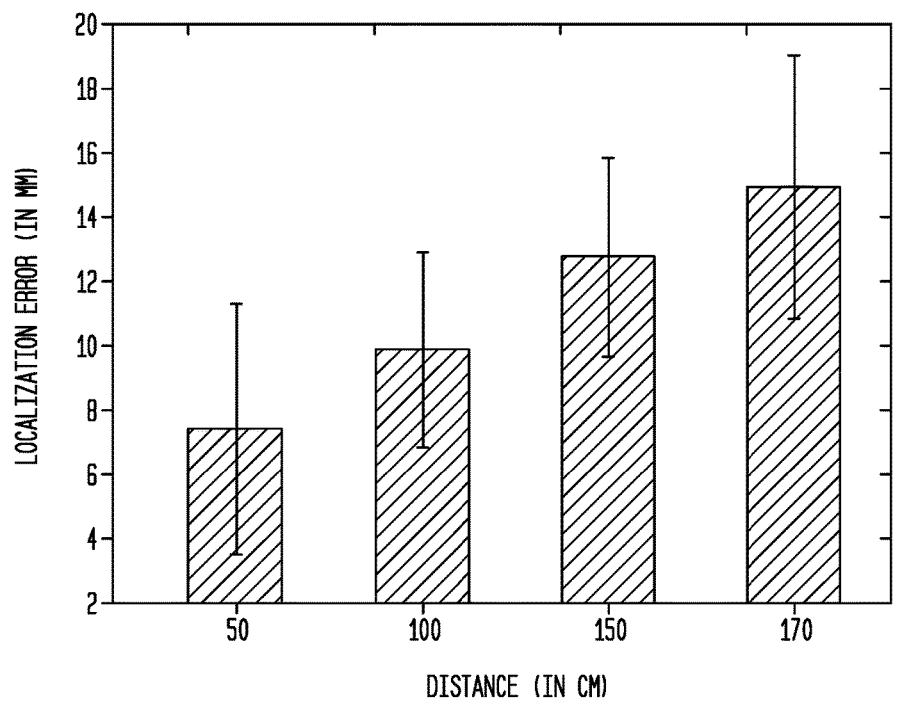
Figure 30:
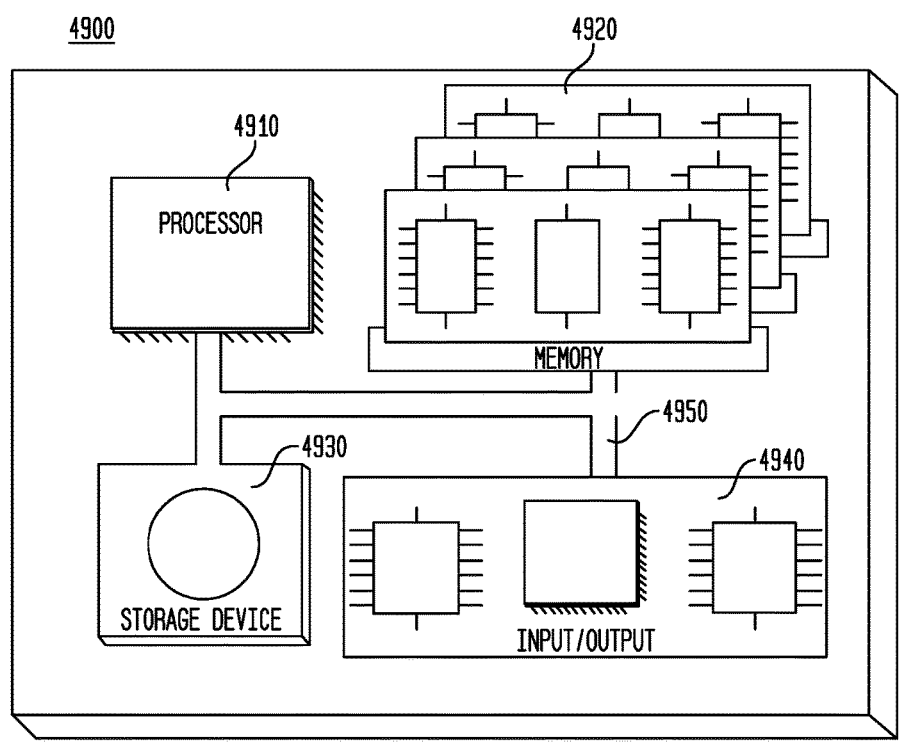
FIG. 30 is an illustrative computer system useful for executing methods according to the present disclosure.

FIG. 29(B) shows the accuracy results when numbers 0 to 9 are drawn on this touch-pad. Each number is repeated 50 times, and the false positive and negative rates are reported here. Observe that all individual numbers can be detected with total errors of less than 15%. This shows that RIO with COTS tags can be used to design a general-purpose UI.

Points of Discussion

Naturally there is much room for further work and possible improvements. We discuss a few points here.

Cost of R System:

R can support multiple tags simultaneously for single point touch tracking using single antenna and single RFID reader. Currently, this combined unit with one antenna, one RFID reader, costs approximately $1600. We expect that dedicated RFID sensing platforms built upon lower-cost hardware (e.g. ThinkMagic reader hardware), together with low-cost off-the-shelf tags will eventually be available to consumers Comparison with Touch-Based Sensing:

Capacitive touch screens found in smartphones, tablets, laptops and the recently introduced PixelSense over a readily-available multi-touch interface. However, smart spaces demand low-cost, low-powered, flexible touch interfaces that can be readily integrated into existing off-the-self items. Current capacitive touch screen technology cannot be easily and cost-effectively integrated into our envisioned smart spaces. We note that RIO offers a touch primitive to enable smart spaces and does not replace capacitive touch technology in all applications. Rather, we expect that RIO will integrate with and extend existing capacitive touch interfaces. For example, while RIO detects our direct interactions with the environment, these interactions can be managed through capacitive touch interfaces on our mobile devices.

Multi-Touch Tracking:

RIO is basically a single touch-tracking system and in near future, we plan to extend it to multi-touch tracking interface. This extension will broaden RIO's potential use-cases. However, for this, we have to model more complex mutual coupling phenomenon to provide accurate impedance tracking.

Impact of Different Blockage Scenarios:

Although we have shown in FIG. 6 that the phase pattern maintains its shape even in the presence of obstacles like door or wall, the experiments are not exhaustive for different static or dynamic blockage scenarios. In near future, we plan to conduct more experiments in different types of blockage scenarios and different environment conditions to better understand the performance of RIO.

Finally, FIG. 29 shows an illustrative computer system 2900 suitable for implementing methods and systems according to an aspect of the present disclosure. As may be immediately appreciated, such a computer system may be integrated into another system and may be implemented via discrete elements or one or more integrated components. The computer system may comprise, for example a computer running any of a number of operating systems. The above-described methods of the present disclosure may be implemented on the computer system 2900 as stored program control instructions.

Computer system 2900 includes processor 2910, memory 2920, storage device 2930, and input/output structure 2940. One or more input/output devices may include a display 2945. One or more busses 2950 typically interconnect the components, 2910, 2920, 2930, and 2940. Processor 2910 may be a single or multi core. Additionally, the system may include accelerators etc. further comprising the system on a chip.

Processor 2910 executes instructions in which embodiments of the present disclosure may comprise steps described in one or more of the Drawing figures or Algorithm steps illustrated in Algorithm 1, Algorithm 2 and Algorithm 3. Such instructions may be stored in memory 2920 or storage device 2930. Data and/or information may be received and output using one or more input/output devices.

Memory 2920 may store data and may be a computer-readable medium, such as volatile or non-volatile memory. Storage device 2930 may provide storage for system 2900 including for example, the previously described methods. In various aspects, storage device 2930 may be a flash memory device, a disk drive, an optical disk device, or a tape device employing magnetic, optical, or other recording technologies.

Input/output structures 2940 may provide input/output operations for system 2900.

At this point, while we have presented this disclosure using some specific examples, those skilled in the art will recognize that our teachings are not so limited. More specifically, our methods can be further extended in that the structural events can embed more temporal information and consider more sophisticated structures including considering more finegrained temporal information, e.g., the transition time distribution, to enrich mined structural events. Also, we have focussed on transition relations among log patterns. There are other useful relations among logs, such as running in parallel that may be employed. Those relations can be further modeled in the workflow graph using undirected edges. We also believe that the methods according to the present disclosure can achieve more utility in an interactive setting, where system admins can interactively explore the system behaviors with different focuses (parameter settings) on coverage, quality or connectivity.

Accordingly, this disclosure should be only limited by the scope of the claims attached hereto.

The invention claimed is:

1. A method comprising:
receiving radio frequency identification (RFID) backscatter signals output from an RFID tag;
determining a phase change of the backscattered signals;
querying the RFID tag continuously;
determining an average signal phase over a time interval;
determining one of the physical events occurring responsive to an object interacting with the RFID tag;
determining that one of the physical events occurred when a detected change in the signal phase change is larger than a threshold;
switching to a tracking mode upon determining that one of the events has occurred;
monitoring and determining, from the received backscatter signals, a change in an effective impedance of the RFID tag responsive to structural or physical events in objects that interact with the RFID tag; and
updating location of an object's interaction on a surface of the RFID during tracking mode responsive to a segmental dynamic time warping (SDTW) methodology.

2. The method of claim 1 further comprising: comparing two sequence segments by stretching and squeezing (warping) on of the sequences until a suitable match between them is determined.

3. The method of claim 1 applied simultaneously to more than one RFID tag.

4. The method of claim 1 further comprising determining a baseline impedance change in the RFID tag due to a desired event.

* * * * *